(12) United States Patent
Xu et al.

(10) Patent No.: US 11,064,551 B2
(45) Date of Patent: Jul. 13, 2021

(54) NETWORK MANAGEMENT METHOD AND CONTROLLER

(71) Applicant: Huawei Technologies Co., Ltd., Guangdong (CN)

(72) Inventors: Changchun Xu, Shanghai (CN); Yuanyuan Wang, Shanghai (CN); Jin Zhang, Shanghai (CN); Yan Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 184 days.

(21) Appl. No.: 16/285,898

(22) Filed: Feb. 26, 2019

(65) Prior Publication Data
US 2019/0191479 A1 Jun. 20, 2019

Related U.S. Application Data

(63) Continuation of application No. PCT/CN2016/096998, filed on Aug. 26, 2016.

(51) Int. Cl.
H04W 76/19 (2018.01)
H04L 12/46 (2006.01)
(Continued)

(52) U.S. Cl.
CPC ......... H04W 76/19 (2018.02); H04L 12/4625 (2013.01); H04W 8/082 (2013.01); H04W 36/12 (2013.01); H04W 36/125 (2018.08); H04W 36/305 (2018.08); H04W 40/28 (2013.01); H04W 40/36 (2013.01); H04W 76/10 (2018.02);
(Continued)

(58) Field of Classification Search
CPC ..... H04W 76/00; H04W 76/10; H04W 76/12; H04W 76/16; H04W 76/19; H04W 76/22; H04W 28/08; H04W 28/0804; H04W 28/0983; H04W 72/00; H04W 72/486;
(Continued)

(56) References Cited

U.S. PATENT DOCUMENTS 8,982,841 B2    3/2015  Srinivasan
2011/0075557 A1 3/2011  Chowdhury et al.
(Continued)

FOREIGN PATENT DOCUMENTS

CN    101646158 A    2/2010
CN    101720090 A    6/2010
(Continued)

OTHER PUBLICATIONS

Huawei, et al., "Charging of SIPTO at the local network", SA WG2 Meeting #86, S2-113130, Jul. 11-15, 2011, 4 pages.
(Continued)

Primary Examiner — Jae Y Lee
Assistant Examiner — Aixa A Guadalupe Cruz
(74) Attorney, Agent, or Firm — Slater Matsil, LLP

(57) ABSTRACT

A network management method and a controller are provided. Elastic scaling of an in-network packet data network IN-PDN is implemented when UE is migrated or detached. In addition, service continuity in a local network of the UE can still be ensured when the UE is migrated or detached, and an IN-PDN resource that is no longer used is reclaimed in time, thereby avoiding a waste of the IN-PDN resource.

20 Claims, 8 Drawing Sheets

(51) Int. Cl.
*H04W 76/18* (2018.01)
*H04W 36/30* (2009.01)
*H04W 76/12* (2018.01)
*H04W 88/16* (2009.01)
*H04W 40/28* (2009.01)
*H04W 40/36* (2009.01)
*H04W 36/12* (2009.01)
*H04W 76/10* (2018.01)
*H04W 8/08* (2009.01)
*H04L 29/08* (2006.01)

(52) U.S. Cl.
CPC ........... *H04W 76/12* (2018.02); *H04W 76/18* (2018.02); *H04W 88/16* (2013.01); *H04L 12/46* (2013.01); *H04L 67/14* (2013.01)

(58) Field of Classification Search
CPC ........... H04W 72/1252; H04L 12/4633; H04L 12/4625
See application file for complete search history.

(56) References Cited

U.S. PATENT DOCUMENTS

| | | | |
|---|---|---|---|
| 2011/0269499 A1 | 11/2011 | Vikberg et al. | |
| 2011/0286410 A1 | 11/2011 | Zembutsu et al. | |
| 2014/0293882 A1* | 10/2014 | Choi | H04W 76/20 370/329 |
| 2014/0301364 A1 | 10/2014 | Xu et al. | |
| 2016/0044531 A1 | 2/2016 | Papa et al. | |
| 2016/0112945 A1* | 4/2016 | Chen | H04W 76/10 370/338 |
| 2016/0119777 A1 | 4/2016 | Kaczmarska-Wojtania et al. | |
| 2016/0227439 A1* | 8/2016 | Wang | H04W 28/085 |
| 2016/0337271 A1* | 11/2016 | McCann | H04L 49/70 |
| 2017/0164244 A1 | 6/2017 | Dai et al. | |
| 2019/0037474 A1* | 1/2019 | Xu | H04W 64/00 |
| 2019/0208572 A1* | 7/2019 | Wang | H04L 61/1511 |

FOREIGN PATENT DOCUMENTS

| | | |
|---|---|---|
| CN | 102238671 A | 11/2011 |
| CN | 102273258 A | 12/2011 |
| CN | 102547889 A | 7/2012 |
| CN | 102833879 A | 12/2012 |
| CN | 104105143 A | 10/2014 |
| CN | 104349405 A | 2/2015 |
| CN | 104618849 A | 5/2015 |
| EP | 2317822 A1 | 5/2011 |
| WO | 2012050493 A1 | 4/2012 |
| WO | 2013009053 A2 | 1/2013 |
| WO | 2016026088 A1 | 2/2016 |

OTHER PUBLICATIONS

Qualcomm Incorporated, et al., "Further analysis for LIPA/SIPTO solution for H(e)NB using a local PDN connection in Solution 1", 3GPP TSG SA WG2 Meeting #78, S2-101737, Feb. 22-26, 2010, 16 pages.

* cited by examiner

NETWORK MANAGEMENT METHOD AND CONTROLLER

CROSS-REFERENCE TO RELATED APPLICATIONS

This application is a continuation of International Application No. PCT/CN2016/096998 filed on Aug. 26, 2016, the disclosure of which is hereby incorporated by reference in its entirety.

TECHNICAL FIELD

The present application relates to the field of communications technologies, and in particular, to a network management method and a controller.

BACKGROUND

As shown in FIG. 1, in a $3^{rd}$ generation (3G) or $4^{th}$ generation (4G) network architecture, user equipment (UE) accesses a packet data network (PDN) by using a core network and a border gateway. In the 3G/4G network architecture, the PDN is in the internetwork (Internet for short), the core network is responsible for sending data to the border gateway, and the border gateway sends the data to the PDN in the Internet.

Data transmission in the Internet is not controlled by the core network. Consequently, a transmission latency and reliability of a network are not ensured, and load of a mobile network is relatively high.

SUMMARY

This application provides a network management method and a controller, so that data between UEs in a same local network does not need to pass through a core network and the Internet, thereby effectively reducing a transmission latency of the network and alleviating load of a mobile network.

According to a first aspect of this application, a network management method is provided. The method includes:

when receiving a notification from a control plane gateway to determine that first UE is disconnected from a first base station, determining, by a controller based on pre-stored IN-PDN distribution information, a first IN-PDN and a first user plane gateway that are accessed by the first UE before the first UE is disconnected from the first base station, where the IN-PDN distribution information is used to indicate a mapping relationship between an IN-PDN, a user plane gateway, and UE;

determining, by the controller based on the IN-PDN distribution information, whether second UE and a second user plane gateway exist, where there is a mapping relationship between the second UE and the first IN-PDN, there is also a mapping relationship between the second UE and the first user plane gateway, and there is a mapping relationship between the second user plane gateway and the first IN-PDN; and determining, by the controller based on a determining result about whether the second UE and the second user plane gateway exist, whether to update a mapping relationship between the first IN-PDN and a forwarding tunnel, a mapping relationship between the first IN-PDN and the first UE, and a mapping relationship between the first IN-PDN and a user plane gateway.

An IN-PDN is a local PDN provided in this application to satisfy a requirement on local networking. Data in the IN-PDN does not need to pass through an aggregation core layer and the Internet, and can be directly looped back locally in a core network, to alleviate load of a mobile network and reduce a transmission latency. That when the first UE accessing the first IN-PDN is disconnected from the first base station, whether the IN-PDN is scaled needs to be determined depending on whether the second UE and the second user plane gateway exist is described in the foregoing implementation. Determining, by the controller, whether the second UE exists is determining whether UE still exists in the first IN-PDN on the first GW-U after the first UE is handed over or detached. Determining, by the controller, whether the second GW-U exists is determining whether the first IN-PDN is distributed across the first GW-U and another GW-U.

In a possible design, that the first UE is disconnected from the first base station may include the following two scenarios:

the first UE is handed over from the first base station to a second base station; or the first UE is detached from the first base station.

In a possible design, the IN-PDN distribution information may be used to indicate a mapping relationship between an IN-PDN and a user plane gateway, a mapping relationship between a user plane gateway and UE, and a mapping relationship between an IN-PDN and UE.

In a possible design, before the determining, by the controller based on the IN-PDN distribution information, whether second UE and a second user plane gateway exist, the method further includes:

deleting, by the controller, a mapping relationship between the first UE and the first user plane gateway from the IN-PDN distribution information.

In a possible design, when the first UE is detached from the first base station, and the determining result is that the IN-PDN distribution information includes the second user plane gateway but does not include the second UE, the determining, by the controller based on a determining result about whether the second UE and the second user plane gateway exist, whether to update a mapping relationship between the first IN-PDN and a forwarding tunnel, a mapping relationship between the first IN-PDN and the first UE, and a mapping relationship between the first IN-PDN and a user plane gateway includes:

deleting, by the controller, a mapping relationship between the first user plane gateway and the first IN-PDN, the mapping relationship between the first user plane gateway and the first UE, and the mapping relationship between the first UE and the first IN-PDN from the IN-PDN distribution information; and obtaining, by the controller, a tunnel identifier corresponding to the first IN-PDN, and sending an indication message to a control plane gateway, where the indication message is used to instruct to delete a forwarding tunnel whose identifier is the tunnel identifier corresponding to the first IN-PDN and whose endpoints are the first user plane gateway and the second user plane gateway, and is used to instruct to delete a processing rule and a forwarding rule that are between UEs associated with the first IN-PDN and that are between the first user plane gateway and the second user plane gateway.

In the foregoing implementation, no UE exists in the first IN-PDN on the first GW-U. Therefore, there is no service communication between UE in the first IN-PDN on the other GW-U and UE on the first GW-U. According to information exchange between the IN-PDN controller and the control plane gateway, the control plane gateway deletes a forwarding tunnel crossing the first user plane gateway and the another user plane gateway for the first IN-PDN, thereby implementing elastic scale-in of the IN-PDN.

In addition, after the IN-PDN is scaled in, resource reclaiming may further be performed on the first IN-PDN on the first GW-U to avoid a resource waste. A reclaimed resource includes a first IN-PDN identifier and a tunnel port that correspond to the first IN-PDN on the first GW-U. The reclaimed first IN-PDN identifier and tunnel port may be reused when another IN-PDN is created, to avoid insufficiency of an IN-PDN identifier and a tunnel port.

In a possible design, when the first UE is handed over from the first base station to the second base station, before the determining, by the controller based on the IN-PDN distribution information, whether second UE and a second user plane gateway exist, the method further includes:

determining, by the controller, a third user plane gateway accessed by the first UE after the first UE is handed over from the first base station to the second base station;

determining, by the controller based on the IN-PDN distribution information, whether there is a mapping relationship between the third user plane gateway and the first IN-PDN; and if there is no mapping relationship between the third user plane gateway and the first IN-PDN, creating, by the controller, the first IN-PDN on the third user plane gateway, and adding the mapping relationship between the third user plane gateway and the first IN-PDN and a mapping relationship between the third user plane gateway and the first UE to the IN-PDN distribution information; or if there is a mapping relationship between the third user plane gateway and the first IN-PDN, adding, by the controller, a mapping relationship between the third user plane gateway and the first UE to the IN-PDN distribution information.

In a possible design, when the determining result is that the IN-PDN distribution information includes the second user plane gateway but does not include the second UE, and there is no mapping relationship between the third user plane gateway and the first IN-PDN, the determining, by the controller based on a determining result about whether the second UE and the second user plane gateway exist, whether to update a mapping relationship between the first IN-PDN and a forwarding tunnel, a mapping relationship between the first IN-PDN and the first UE, and a mapping relationship between the first IN-PDN and a user plane gateway includes:

deleting, by the controller, the mapping relationship between the first user plane gateway and the first IN-PDN and the mapping relationship between the first UE and the first IN-PDN from the IN-PDN distribution information; and obtaining, by the controller, a tunnel identifier corresponding to the first IN-PDN, and sending an indication message to a control plane gateway, where the indication message is used to instruct to delete a forwarding tunnel whose identifier is the tunnel identifier corresponding to the first IN-PDN and whose endpoints are the first user plane gateway and the second user plane gateway, is used to instruct to delete a processing rule and a forwarding rule that are between UEs associated with the first IN-PDN and that are between the first user plane gateway and the second user plane gateway, is used to instruct to create a forwarding tunnel whose identifier is the tunnel identifier corresponding to the first IN-PDN and whose endpoints are the second user plane gateway and the third user plane gateway, and is used to instruct to create a processing rule and a forwarding rule that are between UEs associated with the first IN-PDN and that are between the second user plane gateway and the third user plane gateway.

In the foregoing implementation, no UE exists in the first IN-PDN on the first GW-U. To avoid a resource waste, resource reclaiming may be performed on the first IN-PDN on the first GW-U. Therefore, for the first GW-U, the first IN-PDN is scaled in. Further, no first IN-PDN is created on the third GW-U, and the controller needs to create the first IN-PDN on the third GW-U. Therefore, for the third GW-U, the first IN-PDN is scaled out. According to information exchange between the IN-PDN controller and the control plane gateway, the control plane gateway deletes a forwarding tunnel crossing the first user plane gateway and the another user plane gateway for the first IN-PDN, and a forwarding tunnel crossing the third user plane gateway and the another user plane gateway is created for the first IN-PDN, thereby implementing elastic scaling of the IN-PDN.

In a possible design, when the determining result is that the IN-PDN distribution information includes the second user plane gateway and the second UE, and there is no mapping relationship between the third user plane gateway and the first IN-PDN, the determining, by the controller based on a determining result about whether the second UE and the second user plane gateway exist, whether to update a mapping relationship between the first IN-PDN and a forwarding tunnel, a mapping relationship between the first IN-PDN and the first UE, and a mapping relationship between the first IN-PDN and a user plane gateway includes:

obtaining, by the controller, a tunnel identifier corresponding to the first IN-PDN, and sending an indication message to a control plane gateway, where the indication message is used to instruct to create a forwarding tunnel whose identifier is the tunnel identifier corresponding to the first IN-PDN and whose endpoints are the first user plane gateway and the third user plane gateway, is used to instruct to create a forwarding tunnel whose identifier is the tunnel identifier corresponding to the first IN-PDN and whose endpoints are the second user plane gateway and the third user plane gateway, is used to instruct to create a processing rule and a forwarding rule that are between UEs associated with the first IN-PDN and that are between the first user plane gateway and the third user plane gateway, and is used to instruct to create a processing rule and a forwarding rule that are between UEs associated with the first IN-PDN and that are between the second user plane gateway and the third user plane gateway.

In the foregoing implementation, the first IN-PDN on the first GW-U is still used by another UE. Therefore, resource reclaiming does not need to be performed on the first IN-PDN on the first GW-U. No first IN-PDN is created on the third GW-U. Therefore, the controller needs to create the first IN-PDN on the third GW-U. According to information exchange between the IN-PDN controller and the control plane gateway, the control plane gateway creates a forwarding tunnel crossing the third user plane gateway and the other user plane gateway for the first IN-PDN, thereby implementing elastic scale-out of the IN-PDN.

In a possible design, when the determining result is that the IN-PDN distribution information does not include the second user plane gateway but includes the second UE, and there is no mapping relationship between the third user plane gateway and the first IN-PDN, the determining, by the controller based on a determining result about whether the second UE and the second user plane gateway exist, whether to update a mapping relationship between the first IN-PDN and a forwarding tunnel, a mapping relationship between the first IN-PDN and the first UE, and a mapping relationship between the first IN-PDN and a user plane gateway includes:

obtaining, by the controller, a tunnel identifier corresponding to the first IN-PDN, and sending an indication message to a control plane gateway, where the indication message is used to instruct to create a forwarding tunnel whose identifier is the tunnel identifier corresponding to the first IN-PDN and whose endpoints are the first user plane gateway and the third user plane gateway, and is used to instruct to create a processing rule and a forwarding rule that are between UEs associated with the first IN-PDN and that are between the first user plane gateway and the third user plane gateway.

In the foregoing implementation, according to information exchange between the IN-PDN controller and the control plane gateway, the control plane gateway creates a forwarding tunnel crossing the third user plane gateway and the another user plane gateway for the first IN-PDN, thereby implementing elastic scale-out of the IN-PDN.

In a possible design, before the sending, by the controller, an indication message to a control plane gateway, the method further includes:

determining, by the controller, a second IN-PDN identifier and a second tunnel port that correspond to the first IN-PDN on the second user plane gateway, and determining a third IN-PDN identifier and a third tunnel port that correspond to the first IN-PDN on the third user plane gateway; and the processing rule and the forwarding rule that are between the UEs associated with the first IN-PDN and that are between the second user plane gateway and the third user plane gateway are:

adding the second IN-PDN identifier to a packet sent by UE to the first UE in the first IN-PDN to which the second user plane gateway is corresponding, replacing the second IN-PDN identifier in the packet to which the second IN-PDN identifier is added with the tunnel identifier corresponding to the first IN-PDN, and forwarding the replaced packet to the third tunnel port by using the second tunnel port; and receiving a packet from the third tunnel port by using the second tunnel port, replacing the tunnel identifier corresponding to the first IN-PDN in the packet received by using the second tunnel port with the second IN-PDN identifier, and deleting the second IN-PDN identifier from the replaced packet; and adding the third IN-PDN identifier to a packet sent by the first UE to the UE in the first IN-PDN to which the second user plane gateway is corresponding, replacing the third IN-PDN identifier in the packet to which the third IN-PDN identifier is added with the tunnel identifier corresponding to the first IN-PDN, and forwarding the replaced packet to the second tunnel port by using the third tunnel port; and receiving a packet from the second tunnel port by using the third tunnel port, replacing the tunnel identifier corresponding to the first IN-PDN in the packet received by using the third tunnel port with the third IN-PDN identifier, and deleting the third IN-PDN identifier from the replaced packet.

The processing rule and the forwarding rule that are between the UEs associated with the first IN-PDN and that are between the second GW-U and the third GW-U are defined in the foregoing implementation, to ensure service continuity in a local network of the UE.

In a possible design, before the sending, by the controller, an indication message to a control plane gateway, the method further includes:

determining, by the controller, a first IN-PDN identifier and a first tunnel port that correspond to the first IN-PDN on the first user plane gateway, and determining a third IN-PDN identifier and a third tunnel port that correspond to the first IN-PDN on the third user plane gateway; and the processing rule and the forwarding rule that are between the UEs associated with the first IN-PDN and that are between the first user plane gateway and the third user plane gateway are:

adding the first IN-PDN identifier to a packet sent by UE to the first UE in the first IN-PDN to which the first user plane gateway is corresponding, replacing the first IN-PDN identifier in the packet to which the first IN-PDN identifier is added with the tunnel identifier corresponding to the first IN-PDN, and forwarding the replaced packet to the third tunnel port by using the first tunnel port; and receiving a packet from the third tunnel port by using the first tunnel port, replacing the tunnel identifier corresponding to the first IN-PDN in the packet received by using the first tunnel port with the first IN-PDN identifier, and deleting the first IN-PDN identifier from the replaced packet; and adding the third IN-PDN identifier to a packet sent by the first UE to the UE in the first IN-PDN to which the first user plane gateway is corresponding, replacing the third IN-PDN identifier in the packet to which the third IN-PDN identifier is added with the tunnel identifier corresponding to the first IN-PDN, and forwarding the replaced packet to the first tunnel port by using the third tunnel port; and receiving a packet from the first tunnel port by using the third tunnel port, replacing the tunnel identifier corresponding to the first IN-PDN in the packet received by using the third tunnel port with the third IN-PDN identifier, and deleting the third IN-PDN identifier from the replaced packet.

The processing rule and the forwarding rule that are between the UEs associated with the first IN-PDN and that are between the first GW-U and the third GW-U are defined in the foregoing implementation, to ensure the service continuity in a local network of the UE.

In a possible design, if the first IN-PDN is implemented by using a virtual local area network VLAN, the tunnel identifier corresponding to the first IN-PDN is indicated by using a virtual extensible local area network identifier VNI;

the first tunnel port, the second tunnel port, and the third tunnel port are indicated by using an Internet Protocol IP address of a virtual extensible local area network tunnel endpoint VTEP; and the first IN-PDN identifier, the second IN-PDN identifier, and the third IN-PDN identifier are indicated by using a VLAN identity.

According to a second aspect of this application, a controller is provided. The controller has a function of implementing the foregoing method. The function may be implemented by using hardware, or may be implemented by hardware executing corresponding software. The hardware or software includes one or more modules or units corresponding to the foregoing functions.

In a possible implementation, the controller includes a determining unit, a judging unit, and a processing unit.

The determining unit is configured to: when first UE is disconnected from a first base station, determine, based on IN-PDN distribution information, a first IN-PDN and a first user plane gateway that are accessed by the first UE before the first UE is disconnected from the first base station, where the IN-PDN distribution information is used to indicate a mapping relationship between an IN-PDN, a user plane gateway, and UE.

The judging unit is configured to determine, based on the IN-PDN distribution information, whether second UE and a second user plane gateway exist, where there is a mapping relationship between the second UE and the first IN-PDN, there is also a mapping relationship between the second UE and the first user plane gateway, and there is a mapping relationship between the second user plane gateway and the first IN-PDN.

The processing unit is configured to determine, based on a determining result of the judging unit about whether the second UE and the second user plane gateway exist, whether to update a mapping relationship between the first IN-PDN and a forwarding tunnel, a mapping relationship between the first IN-PDN and the first UE, and a mapping relationship between the first IN-PDN and a user plane gateway.

In another possible implementation, the controller includes a processor and a memory configured to store an instruction executable to the processor. The memory and the processor are connected to each other by using a bus system, and the processor is configured to perform the following operations:

when first UE is disconnected from a first base station, determining, based on IN-PDN distribution information, a first IN-PDN and a first user plane gateway that are accessed by the first UE before the first UE is disconnected from the first base station, where the IN-PDN distribution information is used to indicate a mapping relationship between an IN-PDN, a user plane gateway, and UE;

determining, based on the IN-PDN distribution information, whether second UE and a second user plane gateway exist, where there is a mapping relationship between the second UE and the first IN-PDN, there is also a mapping relationship between the second UE and the first user plane gateway, and there is a mapping relationship between the second user plane gateway and the first IN-PDN; and determining, based on a determining result about whether the second UE and the second user plane gateway exist, whether to update a mapping relationship between the first IN-PDN and a forwarding tunnel, a mapping relationship between the first IN-PDN and the first UE, and a mapping relationship between the first IN-PDN and a user plane gateway.

According to the technical solutions provided in this application, the elastic scaling of the IN-PDN is implemented. When the UE is migrated or detached, the service continuity in the local network of the UE can still be ensured, and an IN-PDN resource that is no longer used is reclaimed in time, thereby avoiding a waste of the IN-PDN resource.

DETAILED DESCRIPTION

Some terms in this application are explained and described below.

Figure 1:
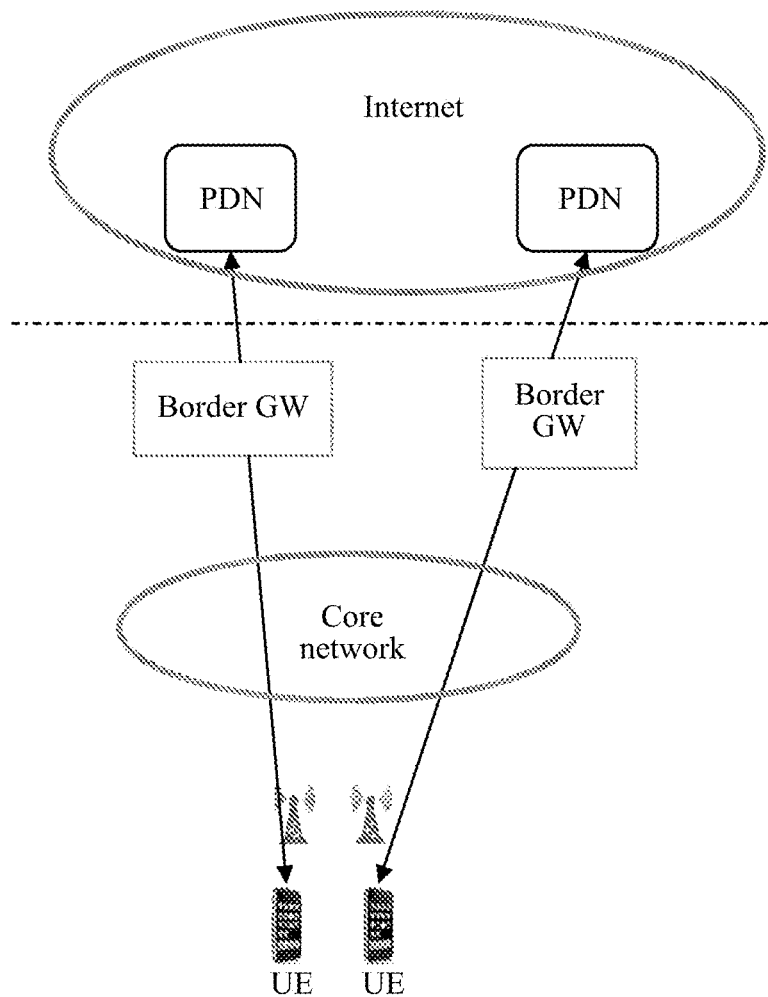
FIG. 1 is a schematic network diagram of a conventional PDN in the prior art.
Figure 2:
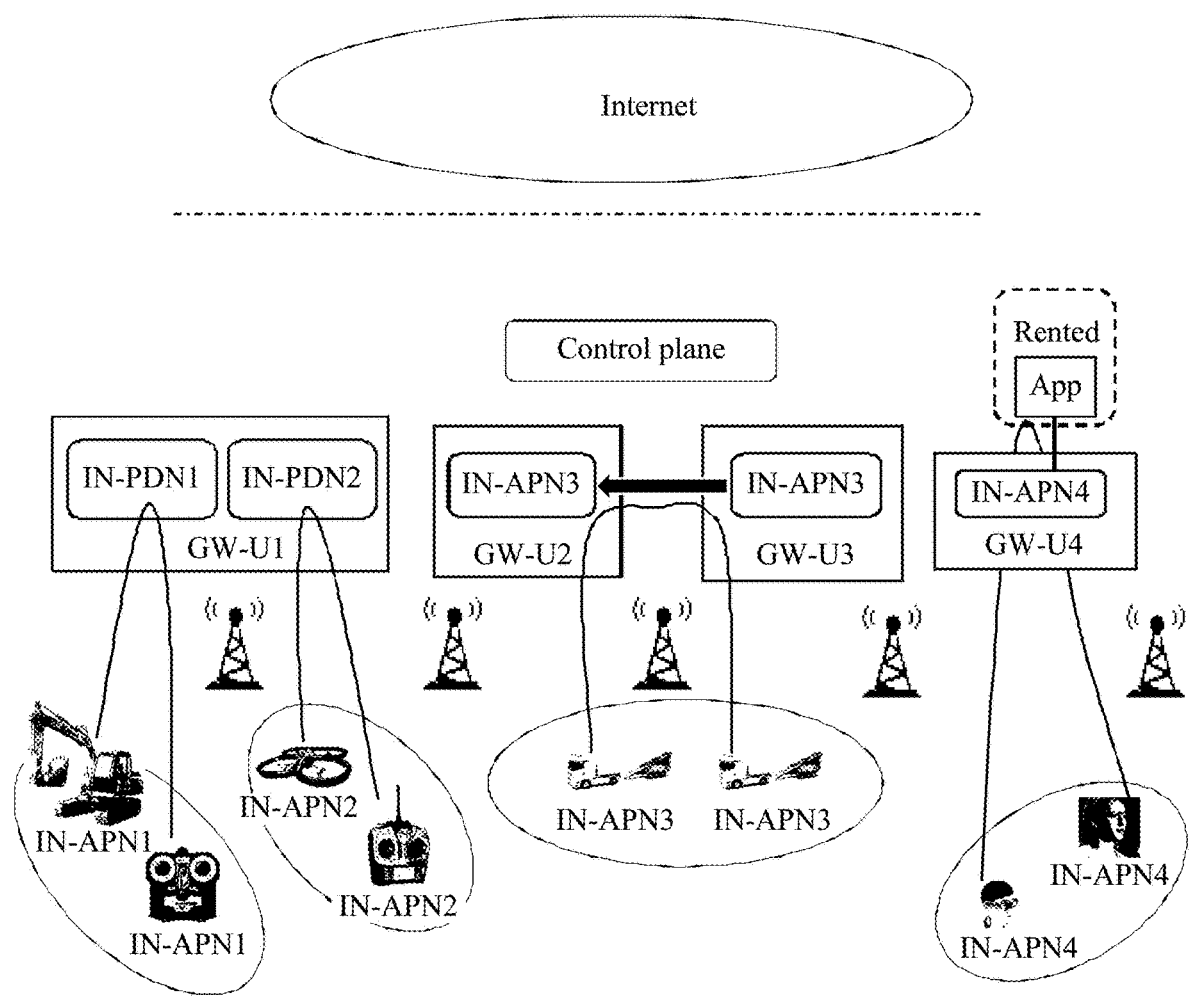
FIG. 2 is a schematic network diagram of an IN-PDN according to an embodiment of this application.

An in-network packet data network (IN-PDN) is a local PDN provided in this application to satisfy a requirement on local networking. FIG. 2 is a schematic diagram of the IN-PDN. An IN-PDN represents a local network. A UE may identify, by using an in-network access point name (IN-APN), an IN-PDN that the UE expects to access. The IN-PDN is deployed at an edge of a mobile network, connects edge/in-network applications, and provides a connection for local interconnection between UEs. In this way, data in the IN-PDN does not need to pass through an aggregation core layer and the Internet, and can be directly looped back locally in a core network, to alleviate load of the mobile network, and reduce a transmission latency. The IN-PDN is different from a conventional PDN or a local area network in the following characteristics: The IN-PDN can be dynamically created, can be scaled (or migrated), and can be associated with a plurality of user plane gateways (GW-U). To achieve the foregoing characteristics of the IN-PDN, a new network element or a logical processing unit, namely, an IN-PDN controller, is introduced to this application.

"Dynamic creation" of the IN-PDN mainly includes the following processes: The IN-PDN controller selects a GW-U for UE based on location information and service information of the UE, and then instructs a control plane gateway (GW-C) to deliver to the GW-U, a correspondence between the IN-PDN and a packet sent by the UE, a corresponding forwarding rule, and a corresponding processing rule, to complete the dynamic creation of the IN-PDN.

The correspondence between the IN-PDN and the packet sent by the UE may be indicated by using both a feature point of the packet sent by the UE and a feature point of the IN-PDN. The feature point of the packet sent by the UE may be a tunnel endpoint identifier (TEID), an Internet Protocol (IP) address of the UE, or a destination IP address. The feature point of the IN-PDN may be a virtual local area network identity (VLAN ID).

The processing rule refers to actions of encapsulating and decapsulating the packet by the GW-U, including actions such as adding/deleting an IN-PDN identifier to/from a packet header and adding/deleting a tunnel identifier to/from the packet header. The forwarding rule includes actions such as forwarding the encapsulated packet from a port and forwarding the decapsulated packet to the corresponding UE.

Figure 3:
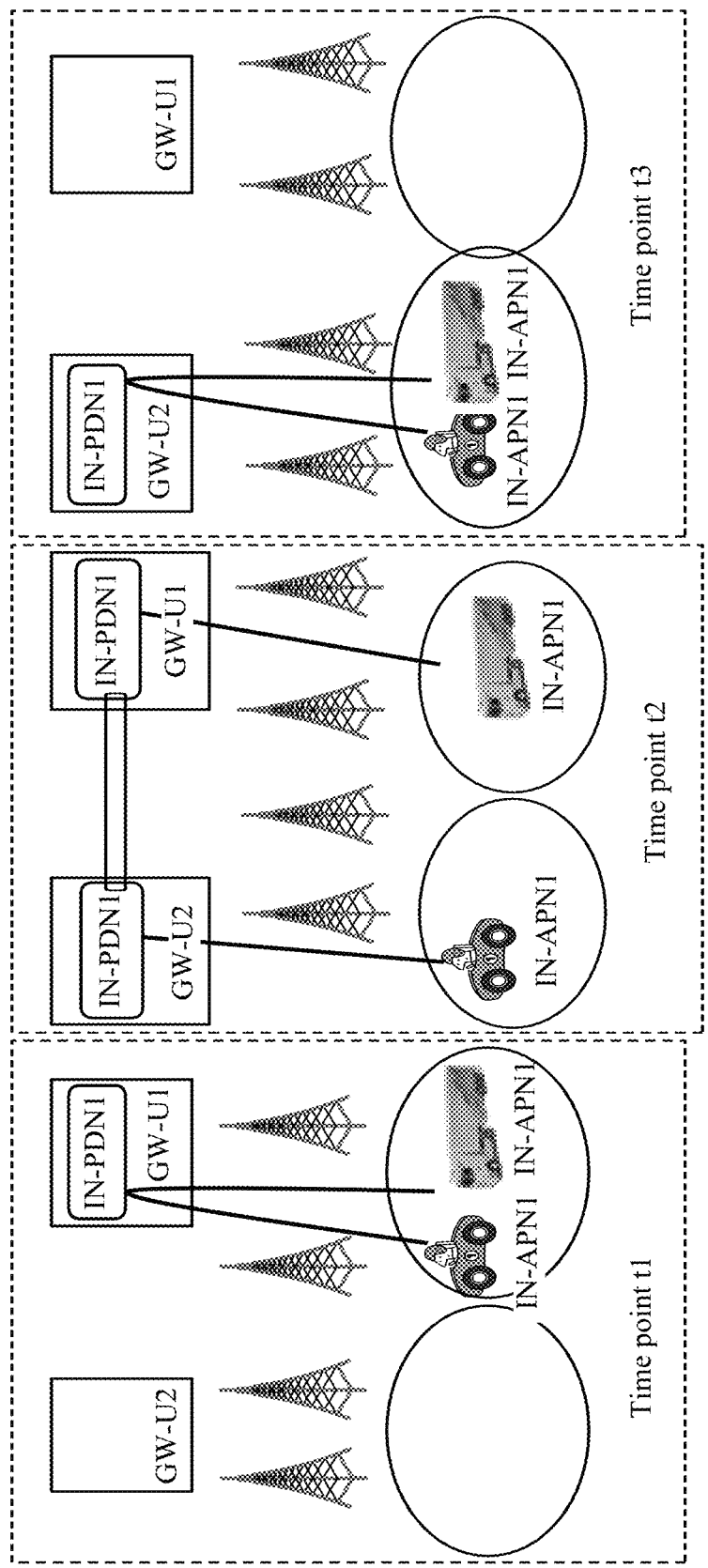
FIG. 3 is a schematic diagram of an IN-PDN scaling scenario according to an embodiment of this application.

"Scalability" of the IN-PDN means that the IN-PDN can dynamically adjust coverage of the IN-PDN as the UE moves. As shown in FIG. 3, at a time point t1, UE 1 and UE 2 are both located in an IN-PDN 1 of a GW-U 1. At a time point t2, the UE 1 moves to a GW-U 2. Therefore, the UE 1 and the UE 2 are distributed to different GW-Us. To ensure service continuity in a local network of the UE 1, the IN-PDN 1 needs to be scaled out to the GW-U 2. Duration from the time point t1 to the time point t2 is a scale-out scenario of the IN-PDN. At a time point t3, as the UE 2 moves, the UE 1 and the UE 2 are distributed in a same GW-U again. To reclaim a related resource of the IN-PDN 1, the IN-PDN 1 needs to be scaled in to the GW-U 2. Duration from the time point t2 to the time point t3 is a scale-in scenario of the IN-PDN.

The IN-PDN can be scaled out to a plurality of GW-Us. Therefore, the IN-PDN may be associated with the plurality of GW-Us. For example, at the time point t2 in FIG. 3, the IN-PDN 1 is associated with both the GW-U 1 and the GW-U 2.

"IN-PDN distribution information" is stored in the IN-PDN controller and is used to indicate a mapping relationship between IN-PDNs, GW-Us, and UEs. The mapping relationship may include a mapping relationship between an IN-PDN and a GW-U, a mapping relationship between a GW-U and UE, and a mapping relationship between an IN-PDN and UE. When the UE is attached to a GW-U, or is handed over from one GW-U to another GW-U, or is detached from a GW-U, the IN-PDN controller adjusts the IN-PDN distribution information in real time based on an actual case. For example, at the time point t1 in FIG. 3, the IN-PDN distribution information stores a mapping relationship between the IN-PDN 1 and the GW-U 1, a mapping relationship between the GW-U 1 and each of the UE 1 and the UE 2, and a mapping relationship between the IN-PDN 1 and each of the UE 1 and the UE 2.

It should be understood that the terms used in this application are merely intended to describe an objective of a particular embodiment instead of limiting this application. "A" and "the" in a singular form that are used in this application and the appended claims are intended to include a plural form unless another meaning is clearly indicated in context. It should also be understood that, the term "and/or" used herein indicates and includes any or all possible combinations of one or more associated listed items.

In addition, although terms such as first, second, and third may be used in this application to describe various information, the information should not be limited to these terms. These terms are merely used to distinguish between information of a same type. For example, first information may also be referred to as second information without departing from the scope of this application. Similarly, second information may also be referred to as first information. Depending on the context, for example, the word "if" used herein may be explained as "while" or "when" or "in response to determining".

To reduce the transmission latency of the network and alleviate the load of the mobile network, the requirement on the local networking is imposed. The local networking means that UE within a range forms a local network relatively close to a user. Data between the UE is directly forwarded in the local network without passing through the core network and the Internet. At present, a fifth-generation (5G) network is required to have a capability of local networking in increasing application scenarios such as intelligent office, real-time sharing of high-definition videos/photos in a sports competition/concert site, post-disaster emergency communication, and automated driving.

To satisfy the requirement on the local networking, this application provides a new network, namely, the IN-PDN, and provides a network management method and a controller, to implement elastic scaling of the IN-PDN, maintain service continuity in the local network in an IN-PDN scale-out scenario, and reclaim a related resource of the IN-PDN in time in an IN-PDN scale-in scenario.

The technical solutions in this application are described below with reference to the accompanying drawings and the embodiments of this specification.

Figure 4:
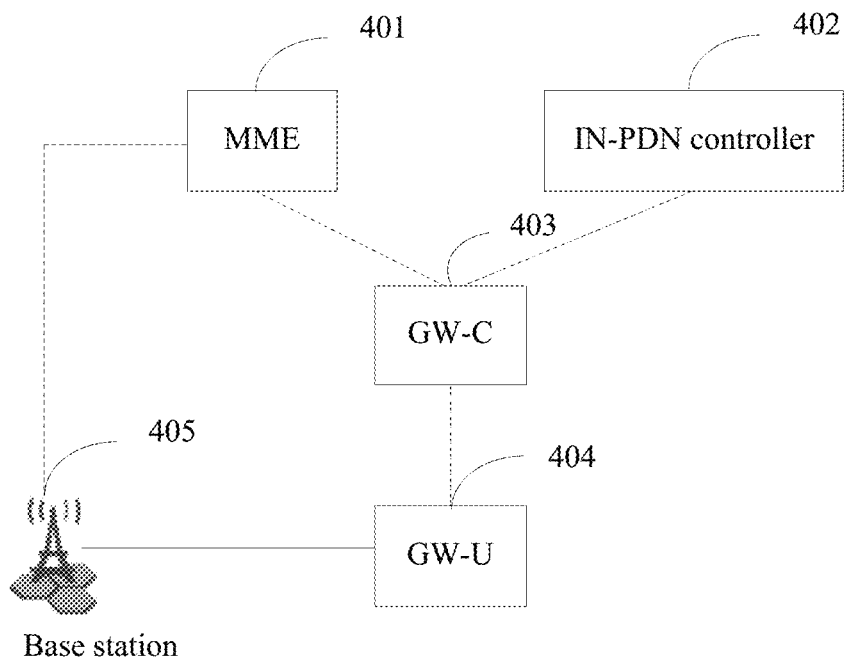
FIG. 4 is a schematic architectural diagram of a system to which a network management method is applied according to an embodiment of this application.

The network management method provided in this application may be applied to a system shown in FIG. 4. The system includes an MME 401, an IN-PDN controller 402, a GW-C 403, a GW-U 404, and a base station 405. A connection line between network elements indicates that an interface exists between the network elements at two ends of the connection line.

A new network element or a logical processing unit, namely, the IN-PDN controller 402, is introduced in the system based on an existing architecture. An interface exists between the IN-PDN controller 402 and the GW-C 403. The IN-PDN controller 402 delivers an indication message to the GW-C 403, and the GW-C 403 controls the GW-U 404 based on content in the indication message.

Benefits of this architecture are: First, the existing system architecture and an existing implementation method can continue being directly used, to reduce costs caused by modification of the system architecture. Second, if control of the IN-PDN controller 402 on the GW-U 404 is added, there are two control network elements for the GW-U 404, and control information of the GW-C 403 and the IN-PDN controller 402 needs to be synchronized, resulting in additional overheads.

In another embodiment of this application, the IN-PDN controller 402 may alternatively be integrated into an existing network element, for example, integrated into the GW-C 403, so that the GW-C 403 can perform a function of the IN-PDN controller 402.

Functions of network elements in the system are separately described below.

The MME 401 is used for access control, mobility management, session management, user authentication, key management, encryption and integrity protection of non-access stratum (NAS) signaling, selection of the GW-C 403, MME selection in a handover process, signaling-plane lawful interception, and allocation and management of a tracking area identity (TAI) list.

The IN-PDN controller 402 is configured to store the IN-PDN distribution information, deliver IN-PDN configuration information to complete creation of the IN-PDN, and instruct the GW-C 403 to reselect the GW-U 404. The IN-PDN configuration information carries an IN-PDN identifier allocated by the IN-PDN controller 402 to a to-be-created IN-PDN. In the IN-PDN scale-out scenario, the IN-PDN controller 402 is further configured to allocate a forwarding tunnel identifier to the IN-PDN, and indicate, to the GW-C 403, GW-Us 404 between which a forwarding tunnel is created and a processing rule and a forwarding rule are updated. In the IN-PDN scale-in scenario, the IN-PDN controller 402 is further configured to indicate, to the GW-C 403, GW-Us 404 between which a forwarding tunnel is deleted and a processing rule and a forwarding rule are updated. In this application, a "controller" is sometimes used as an abbreviation of the IN-PDN controller 402.

The GW-C 403 is configured to send a notification of a UE movement event to the IN-PDN controller 402, where the UE movement event includes a UE handover event and a UE detachment event; and is configured to, based on the indication of the IN-PDN controller 402, create or delete the forwarding tunnel between the GW-Us 404 and update the processing rule and the forwarding rule of the GW-U 404.

The GW-U 404 is configured to encapsulate, decapsulate, and forward a packet based on the processing rule and the forwarding rule that are delivered by the GW-C 403.

The base station 405 is used for radio resource management, header compression and encryption, selection of the MME 401, execution of uplink and downlink service of quality (QoS), scheduling and transmission of a paging message, scheduling and transmission of a system broadcast message, admission control, and the like. In this application, one base station 405 may correspond to a plurality of GW-Us 404.

A wireless communications standard of the base station 405 may include, but is not limited to, Global System for Mobile Communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), Time Division Duplexing-Long Term Evolution (TDD LTE), Frequency Division Duplexing-Long Term Evolution (FDD LTE), Long Term Evolution-Advanced (LTE-Advanced), a personal handyphone system (PHS), Wireless Fidelity (Wi-Fi) stipulated in the 802.11 series protocol, Worldwide Interoperability for Microwave Access (WiMAX), various future-evolved wireless communications systems, and the like.

Figure 5:
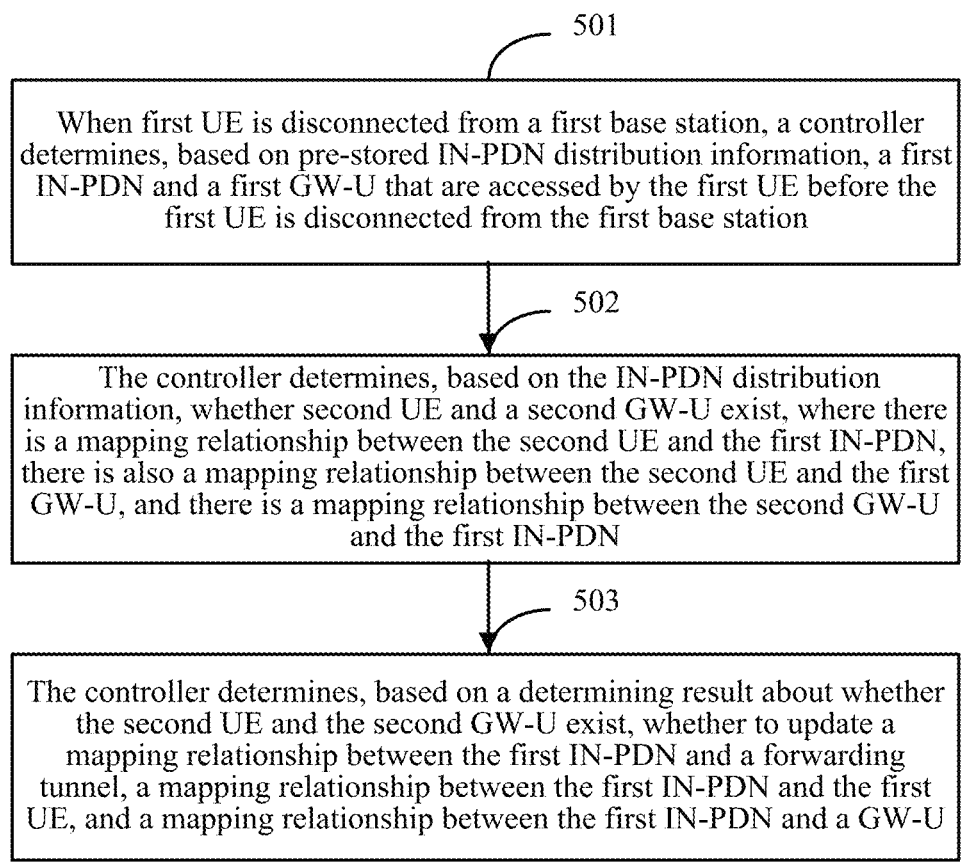
FIG. 5 is a flowchart of a network management method according to an embodiment of this application.

Based on the system provided in FIG. 4, an embodiment of this application further provides a network management method. As shown in FIG. 5, the method includes the following steps.

Step 501: When first UE is disconnected from a first base station, a controller determines, based on pre-stored IN-PDN distribution information, a first IN-PDN and a first GW-U that are accessed by the first UE before the first UE is disconnected from the first base station.

That the first UE is disconnected from the first base station may include the following two scenarios:

First scenario: The first UE is handed over from the first base station to a second base station. Therefore, the controller determines the first IN-PDN and the first GW-U that are accessed by the first UE before the first UE is handed over from the first base station to the second base station.

Second scenario: The first UE is detached from the first base station. Therefore, the controller determines the first IN-PDN and the first GW-U that are accessed by the first UE before the first UE is detached from the first base station.

In an actual application, a movement event of the first UE may be indicated to the controller by the GW-C.

Optionally, before step 502, the controller may further delete a mapping relationship between the first UE and the first GW-U from the IN-PDN distribution information.

Step 502: The controller determines, based on the IN-PDN distribution information, whether second UE and a second GW-U exist, where there is a mapping relationship between the second UE and the first IN-PDN, there is also a mapping relationship between the second UE and the first GW-U, and there is a mapping relationship between the second GW-U and the first IN-PDN.

The second GW-U in this application is, in general, any of other GW-Us having a mapping relationship with the first IN-PDN than the first GW-U.

Optionally, when the first UE is handed over from the first base station to the second base station, before step 502, the controller further needs to determine a third GW-U accessed by the first UE after the first UE is handed over from the first base station to the second base station. Then, the controller determines, based on the IN-PDN distribution information, whether there is a mapping relationship between the third GW-U and the first IN-PDN.

If there is no mapping relationship between the third GW-U and the first IN-PDN, the controller creates the first IN-PDN on the third GW-U. For a specific IN-PDN creation process, refer to the foregoing descriptions, and details are not described herein again. In addition, the controller further needs to add the mapping relationship between the third GW-U and the first IN-PDN to the IN-PDN distribution information, and add a mapping relationship between the third GW-U and the first UE.

If there is a mapping relationship between the third GW-U and the first IN-PDN, the controller adds only a mapping relationship between the third GW-U and the first UE to the IN-PDN distribution information.

Step 503: The controller determines, based on a determining result about whether the second UE and the second GW-U exist, whether to update a mapping relationship between the first IN-PDN and a forwarding tunnel, a mapping relationship between the first IN-PDN and the first UE, and a mapping relationship between the first IN-PDN and a GW-U.

It should be noted that the first UE and the second UE are different UEs. The first GW-U and the second GW-U are different GW-Us. The second GW-U and the third GW-U may be a same GW-U or may be different GW-Us.

Determining, by the controller, whether the second UE exists is determining whether UE still exists in the first IN-PDN on the first GW-U after the first UE is handed over or detached. Determining, by the controller, whether the second GW-U exists is determining whether the first IN-PDN is distributed across the first GW-U and another GW-U.

In this application, the two scenarios, to be specific, the handover scenario and the detachment scenario, may be specifically classified, based on the determining result about whether the second UE and the second GW-U exist, into ten scenarios shown in Table 1 to Table 3. Operations needing to be performed on the first IN-PDN in the ten scenarios are also shown in Table 1 to Table 3.

TABLE 1

In the handover scenario, there is a mapping relationship between the third GW-U to be accessed by the first UE and the first IN-PDN

|  | Second UE exists | No second UE exists |
| --- | --- | --- |
| A second GW-U exists | First scenario: Maintain coverage of the first IN-PDN unchanged | Second scenario: Scale in the first IN-PDN |

TABLE 2

In the handover scenario, there is no mapping relationship between the third GW-U to be accessed by the first UE and the first IN-PDN

|  | Second UE exists | No second UE exists |
| --- | --- | --- |
| A second GW-U exists | Third scenario: Scale out the first IN-PDN | Fourth scenario: Scale out the first IN-PDN between some GW-Us, and scale in the first IN-PDN between some GW-Us |
| No second GW-U exists | Fifth scenario: Scale out the first IN-PDN | Sixth scenario: Migrate the first IN-PDN |

TABLE 3

Detachment scenario

| | Second UE exists | No second UE exists |
|---|---|---|
| A second GW-U exists | Seventh scenario: Maintain coverage of the first IN-PDN unchanged | Eighth scenario: Scale in the first IN-PDN |
| No second GW-U exists | Ninth scenario: Maintain coverage of the first IN-PDN unchanged | Tenth scenario: Delete the first IN-PDN |

Scenarios in which the controller needs to respectively scale out or scale in the IN-PDN and how the controller scales out or scales in the IN-PDN are described below based on the foregoing ten scenarios.

In a first scenario, the first UE is migrated to the third GW-U of the second base station, and the first IN-PDN required by the first UE has been set up on the third GW-U. Before the first UE is migrated, the first IN-PDN is distributed across the first GW-U and another GW-U. After the first UE is migrated, another UE still exists in the first IN-PDN on the first GW-U.

In the first scenario, the first IN-PDN on the first GW-U is still used by the other UE. Therefore, resource reclaiming does not need to be performed on the first IN-PDN on the first GW-U. In addition, the first IN-PDN has covered the first GW-U and the third GW-U. Therefore, the first UE can normally communicate with the other UE in the first IN-PDN on the first GW-U from which the first UE is handed over. Therefore, in the first scenario, the controller only needs to add the mapping relationship between the third GW-U and the first UE to the IN-PDN distribution information and does not need to scale in or scale out the first IN-PDN.

In a second scenario, the first UE is migrated to the third GW-U of the second base station, and the first IN-PDN required by the first UE has been set up on the third GW-U. Before the first UE is migrated, the first IN-PDN is distributed across the first GW-U and another GW-U. After the first UE is migrated, no other UE exists in the first IN-PDN on the first GW-U.

In the second scenario, no UE exists in the first IN-PDN on the first GW-U. Therefore, there is no service communication between UE in the first IN-PDN on the other GW-U and UE on the first GW-U. To avoid a resource waste, resource reclaiming may be performed on the first IN-PDN on the first GW-U, and the first IN-PDN may be scaled in.

A reclaimed resource includes a first IN-PDN identifier and a tunnel port that correspond to the first IN-PDN on the first GW-U. The reclaimed first IN-PDN identifier and tunnel port may be reused when another IN-PDN is created, to avoid insufficiency of an IN-PDN identifier and a tunnel port.

In the second scenario, a specific process of scaling in the first IN-PDN by the controller is as follows: The controller adds the mapping relationship between the third GW-U and the first UE to the IN-PDN distribution information, and deletes a mapping relationship between the first GW-U and the first IN-PDN and the mapping relationship between the first UE and the first IN-PDN from the IN-PDN distribution information. In addition, the controller obtains a tunnel identifier corresponding to the first IN-PDN, and sends an indication message to the GW-C. The indication message is used to instruct to delete a forwarding tunnel whose identifier is the tunnel identifier corresponding to the first IN-PDN and whose endpoints are the first GW-U and the second GW-U, and is used to instruct to delete a processing rule and a forwarding rule that are between UEs associated with the first IN-PDN and that are between the first GW-U and the second GW-U.

For example, it is assumed that UE 1 accesses an IN-PDN 1 on a GW-U 1, and the IN-PDN 1 is distributed on all of the GW-U 1, a GW-U 2, and a GW-U 3. If no other UE exists in the first IN-PDN on the GW-U 1 after the UE 1 is migrated from the GW-U 1 to the GW-U 2, UE 2 exists in the IN-PDN 1 on the GW-U 2, and UE 3 and UE 4 exist in the IN-PDN 1 on the GW-U 3, a processing rule and a forwarding rule that are between the UE 1 and the UE 2 associated with the IN-PDN 1 and that are between the GW-U 1 and the GW-U 2 may be deleted, and a processing rule and a forwarding rule that are between the UE 1 and the UE 3 associated with the IN-PDN 1 and that are between the GW-U 1 and the GW-U 3 and a processing rule and a forwarding rule that are between the UE 1 and the UE 4 associated with the IN-PDN 1 and that are between the GW-U 1 and the GW-U 3 may be deleted.

It should be noted that each IN-PDN has a unique tunnel identifier. The tunnel identifier of the IN-PDN and endpoint information of the forwarding tunnel are both stored in the IN-PDN distribution information.

In a third scenario, the first UE is migrated to the third GW-U of the second base station, and the first IN-PDN required by the first UE is not set up on the third GW-U. Before the first UE is migrated, the first IN-PDN is distributed across the first GW-U and another GW-U. After the first UE is migrated, another UE still exists in the first IN-PDN on the first GW-U.

In the third scenario, the first IN-PDN on the first GW-U is still used by the other UE. Therefore, resource reclaiming does not need to be performed on the first IN-PDN on the first GW-U. No first IN-PDN is created on the third GW-U. Therefore, the controller needs to create the first IN-PDN on the third GW-U.

It is considered that if the first UE performs service communication with the UE that is on the first GW-U from which the first UE is migrated or UE on the another GW-U on which the first IN-PDN is distributed, service interrupt in a local network of the first UE may be caused if a new IN-PDN is created only on the third GW-U to which the first UE is migrated. To avoid this case, forwarding tunnels and corresponding processing rules and forwarding rules further need to be created for the first IN-PDN between the first GW-U and the third GW-U and between the second GW-U and the third GW-U. In this way, the forwarding tunnels may be used for communication between UEs in the first IN-PDN that are between the first GW-U and the third GW-U and between the second GW-U and the third GW-U. In addition, when another UE in the first IN-PDN is subsequently migrated between the first GW-U, the second GW-U, and the third GW-U, communication with the UE in the first IN-PDN on the another GW-U may be performed by directly using the forwarding tunnel without creating a new forwarding tunnel.

Therefore, in the third scenario, a specific process of scaling out the first IN-PDN by the controller is as follows: The controller creates the first IN-PDN on the third GW-U, and adds the mapping relationship between the third GW-U and the first IN-PDN and the mapping relationship between the third GW-U and the first UE to the IN-PDN distribution information. In addition, the controller obtains a tunnel identifier corresponding to the first IN-PDN, and sends an indication message to the GW-C. The indication message is used to instruct to create a forwarding tunnel whose identifier is the tunnel identifier corresponding to the first IN-PDN and whose endpoints are the first GW-U and the third GW-U, is used to instruct to create a forwarding tunnel whose identifier is the tunnel identifier corresponding to the first IN-PDN and whose endpoints are the second user plane gateway and the third user plane gateway, is used to instruct to create a processing rule and a forwarding rule that are between UEs associated with the first IN-PDN and that are between the first GW-U and the third GW-U, and is used to instruct to create a processing rule and a forwarding rule that are between UEs associated with the first IN-PDN and that are between the second GW-U and the third GW-U.

In a fourth scenario, the first UE is migrated to the third GW-U of the second base station, and the first IN-PDN required by the first UE is not set up on the third GW-U. Before the first UE is migrated, the first IN-PDN is distributed across the first GW-U and another GW-U. After the first UE is migrated, no other UE exists in the first IN-PDN on the first GW-U.

In the fourth scenario, no UE exists in the first IN-PDN on the first GW-U. To avoid a resource waste, resource reclaiming may be performed on the first IN-PDN on the first GW-U. Therefore, for the first GW-U, the first IN-PDN is scaled in. Further, no first IN-PDN is created on the third GW-U, and the controller needs to create the first IN-PDN on the third GW-U. Therefore, for the third GW-U, the first IN-PDN is scaled out.

In the fourth scenario, a specific process of scaling in and scaling out the first IN-PDN by the controller is as follows: The controller creates the first IN-PDN on the third GW-U, adds the mapping relationship between the third GW-U and the first IN-PDN and the mapping relationship between the third GW-U and the first UE to the IN-PDN distribution information, and deletes a mapping relationship between the first GW-U and the first IN-PDN and the mapping relationship between the first UE and the first IN-PDN from the IN-PDN distribution information. In addition, the controller obtains a tunnel identifier corresponding to the first IN-PDN, and sends an indication message to the GW-C. The indication message is used to instruct to delete a forwarding tunnel whose identifier is the tunnel identifier corresponding to the first IN-PDN and whose endpoints are the first GW-U and the second GW-U, is used to instruct to delete a processing rule and a forwarding rule that are between UEs associated with the first IN-PDN and that are between the first GW-U and the second GW-U, is used to instruct to create a forwarding tunnel whose identifier is the tunnel identifier corresponding to the first IN-PDN and whose endpoints are the second user plane gateway and the third user plane gateway, and is used to instruct to create a processing rule and a forwarding rule that are between UEs associated with the first IN-PDN and that are between the second GW-U and the third GW-U.

In a fifth scenario, the first UE is migrated to the third GW-U of the second base station, and the first IN-PDN required by the first UE is not set up on the third GW-U. Before the first UE is migrated, the first IN-PDN is distributed only on the first GW-U. After the first UE is migrated, another UE still exists in the first IN-PDN on the first GW-U.

In the fifth scenario, a specific process of scaling out the first IN-PDN by the controller is as follows: The controller creates the first IN-PDN on the third GW-U, and adds the mapping relationship between the third GW-U and the first IN-PDN and the mapping relationship between the third GW-U and the first UE to the IN-PDN distribution information. In addition, the controller obtains a tunnel identifier corresponding to the first IN-PDN, and sends an indication message to the GW-C. The indication message is used to instruct to create a forwarding tunnel whose identifier is the tunnel identifier corresponding to the first IN-PDN and whose endpoints are the first GW-U and the third GW-U, and is used to instruct to create a processing rule and a forwarding rule that are between UEs associated with the first IN-PDN and that are between the first GW-U and the third GW-U.

In a sixth scenario, the first UE is migrated to the third GW-U of the second base station, and the first IN-PDN required by the first UE is not set up on the third GW-U. Before the first UE is migrated, the first IN-PDN is distributed only on the first GW-U. After the first UE is migrated, no other UE exists in the first IN-PDN on the first GW-U.

In the sixth scenario, before and after the first UE is migrated, the first IN-PDN covers only one GW-U, but coverage of the first IN-PDN is adjusted from the first GW-U to the third GW-U. Therefore, it may be considered that the first IN-PDN is migrated.

In the sixth scenario, a specific process of migrating the first IN-PDN by the controller is as follows: The controller creates the first IN-PDN on the third GW-U, and adds the mapping relationship between the third GW-U and the first IN-PDN and the mapping relationship between the third GW-U and the first UE to the IN-PDN distribution information. In addition, the controller deletes a mapping relationship between the first GW-U and the first IN-PDN and the mapping relationship between the first UE and the first IN-PDN from the IN-PDN distribution information.

Optionally, in the sixth scenario, the controller may further reclaim a resource of the first IN-PDN. The first IN-PDN is distributed only on the first GW-U. Therefore, there is no forwarding tunnel corresponding to the first IN-PDN, and the reclaimed resource herein includes only a first IN-PDN identifier corresponding to the first IN-PDN on the first GW-U. The first IN-PDN identifier corresponding to the first IN-PDN on the first GW-U is included.

In a seventh scenario, the first UE is detached from the first GW-U. Before the first UE is detached, the first IN-PDN is distributed across the first GW-U and another GW-U, and another UE still exists in the first IN-PDN on the first GW-U.

In the seventh scenario, the first IN-PDN on the first GW-U is still used by the other UE. Therefore, resource reclaiming does not need to be performed on the first IN-PDN on the first GW-U. Therefore, the controller only needs to delete the mapping relationship between the first UE and the first IN-PDN and the mapping relationship between the first GW-U and the first UE from the IN-PDN distribution information and does not need to scale in or scale out the first IN-PDN.

In an eighth scenario, the first UE is detached from the first GW-U. Before the first UE is detached, the first IN-PDN is distributed across the first GW-U and another GW-U, and no other UE exists in the first IN-PDN on the first GW-U.

In the eighth scenario, no UE exists in the first IN-PDN on the first GW-U. Therefore, there is no service communication between UE in the first IN-PDN on the other GW-U and UE on the first GW-U. To avoid a resource waste, resource reclaiming may be performed on the first IN-PDN on the first GW-U, and the first IN-PDN may be scaled in.

In the eighth scenario, a specific process of scaling in the first IN-PDN by the controller is as follows: The controller deletes a mapping relationship between the first GW-U and the first IN-PDN, the mapping relationship between the first GW-U and the first UE, and the mapping relationship between the first UE and the first IN-PDN from the IN-PDN distribution information. In addition, the controller obtains a tunnel identifier corresponding to the first IN-PDN, and sends an indication message to the GW-C. The indication message is used to instruct to delete a forwarding tunnel whose identifier is the tunnel identifier corresponding to the first IN-PDN and whose endpoints are the first GW-U and the second GW-U, and is used to instruct to delete a processing rule and a forwarding rule that are between UEs associated with the first IN-PDN and that are between the first GW-U and the second GW-U.

In a ninth scenario, the first UE is detached from the first GW-U. Before the first UE is detached, the first IN-PDN is distributed only on the first GW-U, and another UE still exists in the first IN-PDN on the first GW-U.

The ninth scenario is similar to the seventh scenario. The controller only needs to delete the mapping relationship between the first UE and the first IN-PDN and the mapping relationship between the first GW-U and the first UE from the IN-PDN distribution information and does not need to scale in or scale out the first IN-PDN.

In a tenth scenario, the first UE is detached from the first GW-U. Before the first UE is detached, the first IN-PDN is distributed only on the first GW-U, and no other UE exists in the first IN-PDN on the first GW-U.

In the tenth scenario, before the first UE is detached, the first IN-PDN is used only by the first UE. Therefore, after the first UE is detached, the controller may delete the first IN-PDN and reclaim a resource of the first IN-PDN. The first IN-PDN is distributed only on the first GW-U. Therefore, there is no forwarding tunnel corresponding to the first IN-PDN, and the reclaimed resource herein includes only a first IN-PDN identifier corresponding to the first IN-PDN on the first GW-U.

The IN-PDN in this application is only a virtual network. Therefore, an actual network resource does not need to be applied for in a creation process of the IN-PDN. Therefore, when the first IN-PDN is deleted, the controller only needs to delete the mapping relationship between the first GW-U and the first IN-PDN, the mapping relationship between the first GW-U and the first UE, and the mapping relationship between the first UE and the first IN-PDN from the IN-PDN distribution information.

The processing rule and the forwarding rule that are between the UEs associated with the first IN-PDN and that are between the second GW-U and the third GW-U and the processing rule and the forwarding rule that are between the UEs associated with the first IN-PDN and that are between the first GW-U and the third GW-U in the third scenario to the fifth scenario are described below.

Before sending the indication message to the GW-C, the controller may determine, based on the IN-PDN distribution information, the first IN-PDN identifier and a first tunnel port that correspond to the first IN-PDN on the first GW-U, a second IN-PDN identifier and a second tunnel port that correspond to the first IN-PDN on the second GW-U, and a third IN-PDN identifier and a third tunnel port that correspond to the first IN-PDN on the third GW-U.

Therefore, the processing rule and the forwarding rule that are between the UEs associated with the first IN-PDN and that are between the second GW-U and the third GW-U are: adding the second IN-PDN identifier to a packet sent by UE to the first UE in the first IN-PDN to which the second GW-U is corresponding, replacing the second IN-PDN identifier in the packet to which the second IN-PDN identifier is added with the tunnel identifier corresponding to the first IN-PDN, and forwarding the replaced packet to the third tunnel port by using the second tunnel port; receiving a packet from the third tunnel port by using the second tunnel port, replacing the tunnel identifier corresponding to the first IN-PDN in the packet received by using the second tunnel port with the second IN-PDN identifier, and deleting the second IN-PDN identifier from the replaced packet; adding the third IN-PDN identifier to a packet sent by the first UE to the UE in the first IN-PDN to which the second GW-U is corresponding, replacing the third IN-PDN identifier in the packet to which the third IN-PDN identifier is added with the tunnel identifier corresponding to the first IN-PDN, and forwarding the replaced packet to the second tunnel port by using the third tunnel port; and receiving a packet from the second tunnel port by using the third tunnel port, replacing the tunnel identifier corresponding to the first IN-PDN in the packet received by using the third tunnel port with the third IN-PDN identifier, and deleting the third IN-PDN identifier from the replaced packet.

The processing rule and the forwarding rule that are between the UEs associated with the first IN-PDN and that are between the first GW-U and the third GW-U are: adding the first IN-PDN identifier to a packet sent by UE to the first UE in the first IN-PDN to which the first GW-U is corresponding, replacing the first IN-PDN identifier in the packet to which the first IN-PDN identifier is added with the tunnel identifier corresponding to the first IN-PDN, and forwarding the replaced packet to the third tunnel port by using the first tunnel port; receiving a packet from the third tunnel port by using the first tunnel port, replacing the tunnel identifier corresponding to the first IN-PDN in the packet received by using the first tunnel port with the first IN-PDN identifier, and deleting the first IN-PDN identifier from the replaced packet; adding the third IN-PDN identifier to a packet sent by the first UE to the UE in the first IN-PDN to which the first GW-U is corresponding, replacing the third IN-PDN identifier in the packet to which the third IN-PDN identifier is added with the tunnel identifier corresponding to the first IN-PDN, and forwarding the replaced packet to the first tunnel port by using the third tunnel port; and receiving a packet from the first tunnel port by using the third tunnel port, replacing the tunnel identifier corresponding to the first IN-PDN in the packet received by using the third tunnel port with the third IN-PDN identifier, and deleting the third IN-PDN identifier from the replaced packet.

In this application, the IN-PDN may be implemented by using a virtual local area network (VLAN for short) technology, but not limited to the VLAN technology. For example, the IN-PDN may alternatively be implemented by using a local area network (LAN) technology.

If the first IN-PDN is implemented by using the VLAN technology, correspondingly, the forwarding tunnel of the first IN-PDN may be implemented by using a virtual extensible local area network (VxLAN) technology. The tunnel identifier corresponding to the first IN-PDN may be indicated by using a virtual extensible local area network identifier (VNI). The first tunnel port, the second tunnel port, and the third tunnel port may be indicated by using an IP address of a virtual extensible local area network tunnel endpoint (VTEP). The first IN-PDN identifier, the second IN-PDN identifier, and the third IN-PDN identifier may be indicated by using a VLAN ID.

To more clearly describe the technical solution of this application, the foregoing technical solution is further described below by using the fourth scenario and the eighth scenario as examples. It should be noted that the following two embodiments are merely two implementations of this application and do not constitute a limitation on this application.

Embodiment 1

Embodiment 1 corresponds to the foregoing fourth scenario, to be specific, the first UE is migrated from the first GW-U of the first base station to the third GW-U of the second base station, and the first IN-PDN required by the first UE is not set up on the third GW-U. Before the first UE is migrated, the first IN-PDN is distributed across the first GW-U and the other GW-U. After the first UE is migrated, no other UE exists in the first IN-PDN on the first GW-U.

Figure 6A:
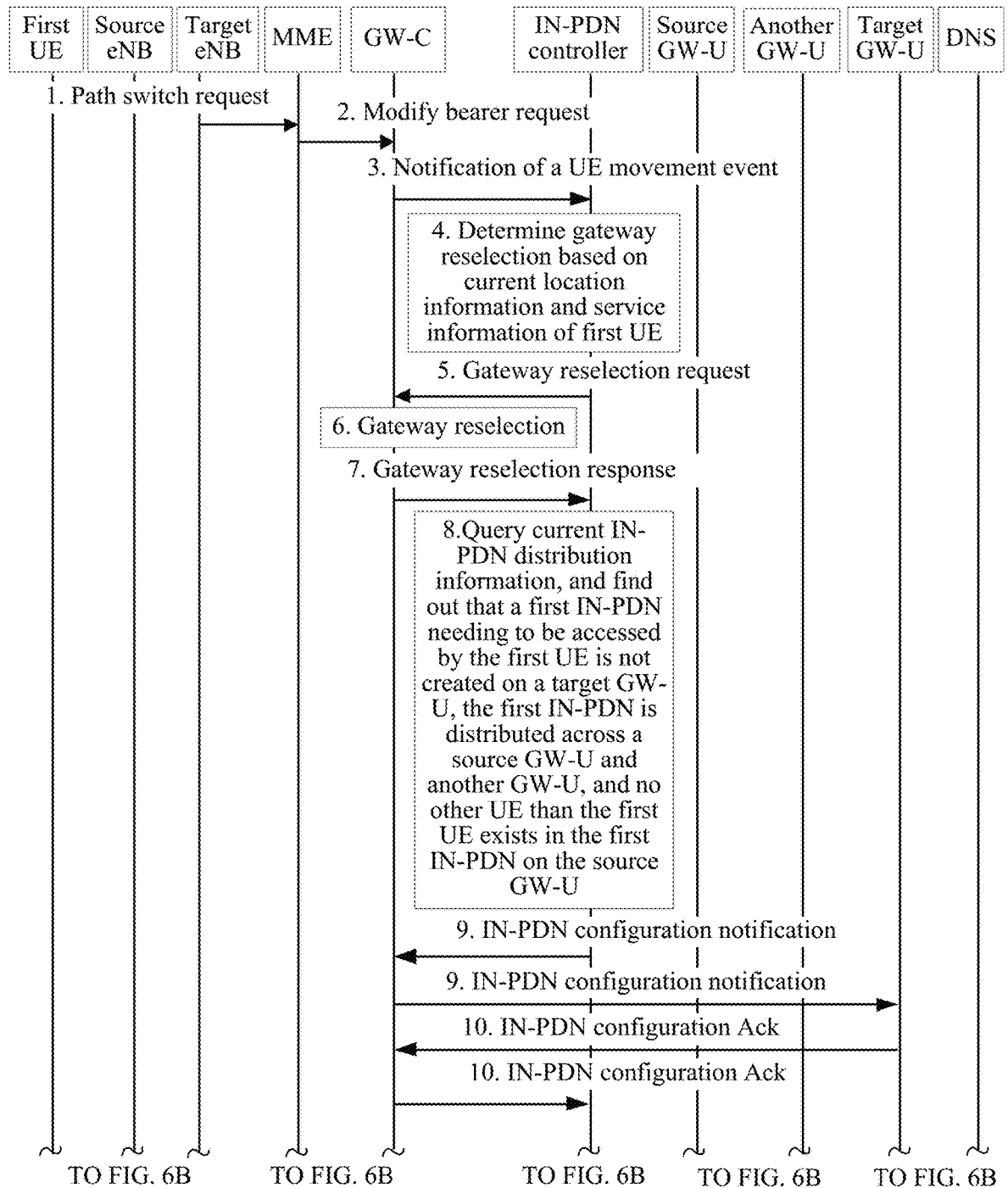
FIG. 6A and FIG. 6B are a schematic diagram of signaling exchange between network elements in a UE handover scenario according to an embodiment of this application.
Figure 6B:
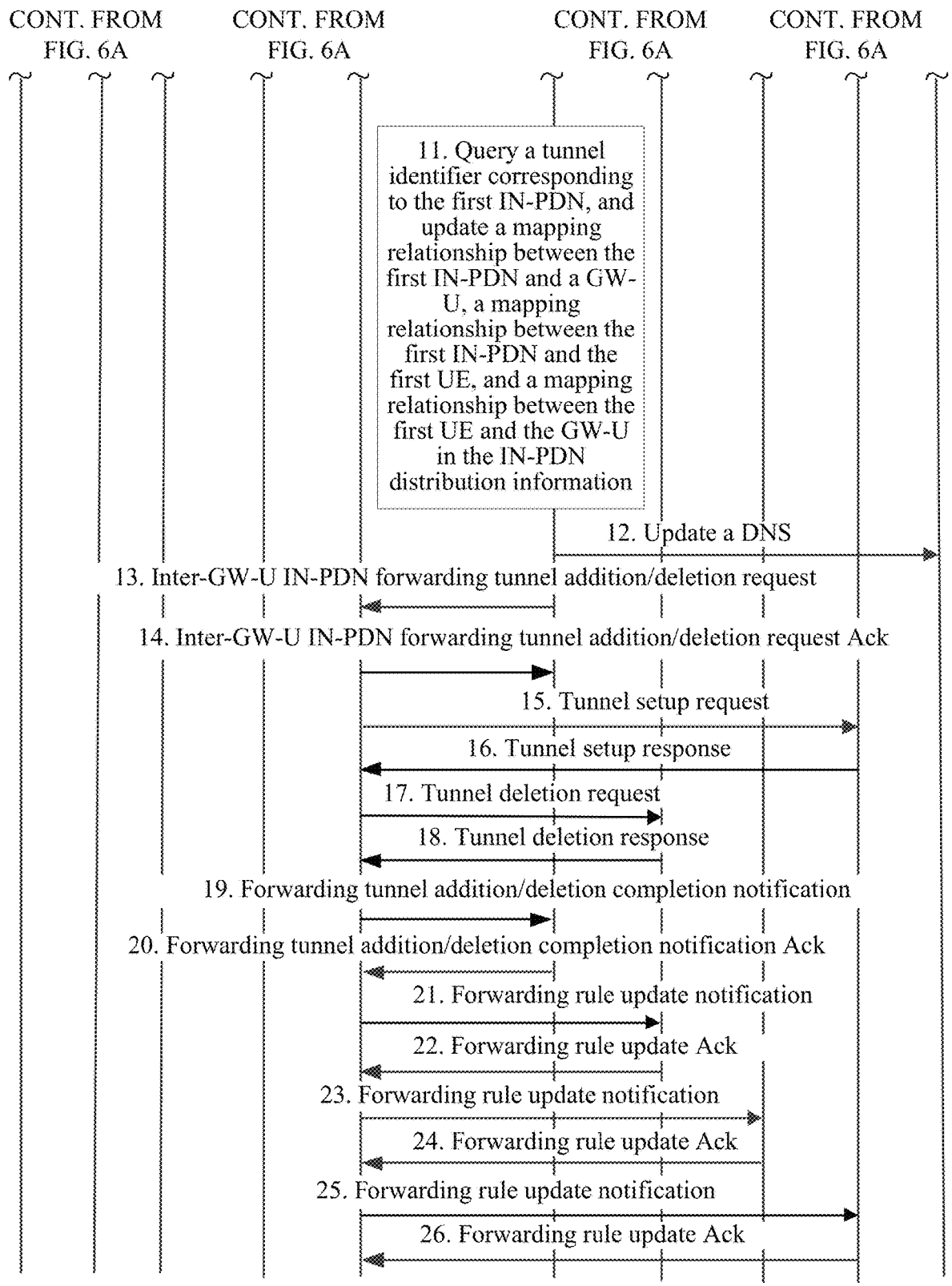

In this scenario, a signaling exchange procedure between network elements is shown in FIG. 6A and FIG. 6B.

1. A target eNB sends a path switch request message to an MME, where the path switch request message carries a GTP address and a TEID of the target eNB and target TAI information.

The target eNB herein is equivalent to the foregoing second base station.

2. The MME sends a modify bearer request message to the GW-C, and notifies the GW-C of the general packet radio service tunneling protocol (GTP) address and the TEID of the target eNB and the target TAI information.

3. The GW-C sends a notification of a UE movement event to an IN-PDN controller, to notify that the first UE moves from a source eNB to the target eNB.

The source eNB herein is equivalent to the foregoing first base station.

4. The IN-PDN controller determines gateway reselection based on information, such as location information and a service, about the first UE.

5. The IN-PDN controller sends a gateway reselection request to the GW-C.

6. If the gateway reselection request in step 5 carries information about a target GW-U such as an IP address of the target GW-U, directly jump to step 7. Otherwise, the GW-C performs the gateway reselection.

When performing the gateway reselection, the GW-C may send a domain name system (DNS) request to a DNS, where the DNS request carries an IN-APN of the first UE.

The DNS determines the IN-APN carried in the received DNS request, and if determining that the IN-APN is in an IN-APN format, queries locally stored GW-U information for a matched GW-U by using the IN-APN of the first UE and cell information of the first UE. A location of the matched GW-U is close to that of the first UE, and an IN-PDN corresponding to the IN-APN of the first UE has been created on the matched GW-U.

If an appropriate GW-U is matched, the DNS adds an IP address of the matched GW-U to a DNS request response, and returns the DNS request response to the GW-C.

If no appropriate GW-U is matched, the DNS requests the IN-PDN controller to select a new GW-U for the UE. After determining the new GW-U for the UE, the IN-PDN controller returns the cell information and the IN-APN of the first UE and information about the new GW-U to the DNS. The DNS adds an IP address of the GW-U selected by the IN-PDN to a DNS request response, and returns the DNS request response to the GW-C. In this way, when another UE is attached, if cell information and an IN-APN of the other UE are both the same as the cell information and the IN-APN of the first UE, the GW-C sends a request to the DNS. The DNS may directly return the corresponding GW-U without requesting the IN-PDN controller to select a GW-U for the other UE.

7. The GW-C sends a gateway reselection response to the IN-PDN controller, where the gateway reselection response carries a TEID and the IP address of the target GW-U reselected for the first UE.

The target GW-U herein is equivalent to the foregoing third GW-U.

8. The IN-PDN controller queries current IN-PDN distribution information, and finds out that the first IN-PDN needing to be accessed by the first UE is not created on the target GW-U, the first IN-PDN is distributed across a source GW-U and the another GW-U, and no other UE than the first UE exists in the first IN-PDN on the source GW-U.

The source GW-U herein is equivalent to the foregoing first GW-U. The other GW-U on which the first IN-PDN is distributed is equivalent to the foregoing second GW-U. Another UE in the first IN-PDN on the source GW-U is equivalent to the foregoing second UE.

9. The IN-PDN controller sends an IN-PDN configuration notification to the GW-C. The GW-C forwards the IN-PDN configuration notification to the target GW-U, where the IN-PDN configuration notification carries IN-PDN configuration information.

The IN-PDN configuration information includes an IN-PDN identifier of the first IN-PDN on the target GW-U that is allocated by the IN-PDN controller to a to-be-configured first IN-PDN.

10. After completing IN-PDN configuration, the target GW-U sends an IN-PDN configuration notification acknowledgment (Ack) to the GW-C. The GW-C forwards the IN-PDN configuration notification acknowledgment to the IN-PDN controller.

11. The IN-PDN controller queries the IN-PDN distribution information for a tunnel identifier corresponding to the first IN-PDN, and updates a mapping relationship between the first IN-PDN and a GW-U, a mapping relationship between the first IN-PDN and the first UE, and a mapping relationship between the first UE and the GW-U in the IN-PDN distribution information.

If the IN-PDN is implemented by using a VLAN technology, correspondingly, information about the source GW-U and a VLAN ID corresponding to the first IN-PDN on the source GW-U are deleted from the IN-PDN distribution information, and the information about the target GW-U and a VLAN ID corresponding to the first IN-PDN on the target GW-U are added. In addition, information about the first UE is deleted from information about UE connected to the source GW-U, and the information about the first UE is added to information about UE connected to the target GW-U.

12. The IN-PDN controller updates updated distribution of the first IN-PDN to a DNS based on the updated IN-PDN distribution information.

13. The IN-PDN controller sends an inter-GW-U IN-PDN forwarding tunnel addition/deletion request to the GW-C, where the request carries the tunnel identifier that is of the first IN-PDN and that is queried by the IN-PDN controller, information about a GW-U on which tunnel addition/deletion is to be performed, an IN-PDN identifier of the first IN-PDN on each GW-U on which tunnel addition/deletion is to be performed, and a tunnel addition/deletion flag of each GW-U on which tunnel addition/deletion is to be performed.

If the IN-PDN is implemented by using the VLAN technology, the tunnel identifier may be indicated by using a VNI, the IN-PDN identifier may be indicated by using a VLAN ID, and the information about the GW-U may be identified by using an IP address of the GW-U.

The IN-PDN controller may make an appointment with the GW-C in advance that, for example, the flag being equal to 0 indicates that a tunnel is deleted and a forwarding rule and a processing rule between tunnels are updated, the flag being equal to 1 indicates that a tunnel is set up and a forwarding rule and a processing rule between tunnels are updated, and the flag being equal to 2 indicates that a forwarding rule and a processing rule between tunnels are updated.

In this embodiment, a flag of the target GW-U is equal to 1, a flag of the source GW-U is equal to 0, and a flag of the other GW-U on which the first IN-PDN is distributed is equal to 2.

14. The GW-C sends an inter-GW-U IN-PDN forwarding tunnel addition/deletion request Ack to the IN-PDN controller.

15. The GW-C receives a tunnel addition/deletion flag of the target GW-U that is equal to 1, and therefore sends a tunnel setup request to the target GW-U, where the tunnel setup request carries the tunnel identifier transferred from the IN-PDN controller in step 13.

16. The target GW-U sends a tunnel setup response to the GW-C, where the tunnel setup response carries information about a port allocated by the target GW-U to a tunnel.

17. The GW-C receives a tunnel addition/deletion flag of the source GW-U that is equal to 0, and therefore sends a tunnel deletion request to the source GW-U, where the tunnel deletion request carries the tunnel identifier transferred from the IN-PDN controller in step 13.

18. The source GW-U sends a tunnel deletion response to the IN-PDN controller.

19. The GW-C sends a forwarding tunnel addition/deletion completion notification to the IN-PDN controller.

20. The IN-PDN controller sends a forwarding tunnel addition/deletion completion notification Ack to the GW-C.

21. The GW-C sends a forwarding rule update notification to the source GW-U, to update a forwarding rule and a processing rule of the source GW-U.

Updating of the forwarding rule and the processing rule is specifically: deleting a forwarding rule and a processing rule that are between UEs related to the first IN-PDN and that are from the source GW-U to the another GW-U.

22. The source GW-U sends a forwarding rule update Ack to the GW-C.

23. The GW-C sends a forwarding rule update notification to the other GW-U, to update a forwarding rule and a processing rule of the other GW-U.

If a forwarding tunnel is implemented by using a VxLAN technology, updating of the forwarding rule and the processing rule is specifically: deleting a forwarding rule and a processing rule that are between UEs related to the first IN-PDN and that are from the another GW-U to the source GW-U. A VLAN ID corresponding to the first IN-PDN on the another GW-U is added to a packet sent by UE to the first UE in the first IN-PDN to which the another GW-U is corresponding, the VLAN ID in the packet to which the VLAN ID is added is replaced with the VNI of the first IN-PDN, and then the replaced packet is forwarded, by using a tunnel port created on the another GW-U for the first IN-PDN, to a tunnel port created in step 16. In addition, a packet from the first UE that is forwarded by using the tunnel port created in step 16 is received by using the tunnel port created on the another GW-U for the first IN-PDN, the VNI in the received packet is replaced with the VLAN ID corresponding to the first IN-PDN on the another GW-U, and then the VLAN ID is deleted from the replaced packet.

24. The another GW-U sends a forwarding rule update Ack to the GW-C.

25. The GW-C sends a forwarding rule update notification to the target GW-U, to update a forwarding rule and a processing rule of the target GW-U.

If the forwarding tunnel is implemented by using the VxLAN technology, updating of the forwarding rule and the processing rule is specifically: adding the VLAN ID corresponding to the first IN-PDN on the target GW-U to a packet sent by the first UE to the UE in the first IN-PDN to which the another GW-U is corresponding, replacing the VLAN ID in the packet to which the VLAN ID is added with the VNI of the first IN-PDN, and then forwarding, by using the tunnel port created in step 16, the replaced packet to the tunnel port created on the another GW-U for the first IN-PDN; and receiving, by using the tunnel port created in step 16, a packet sent to the first UE that is forwarded by using the tunnel port created on the another GW-U for the first IN-PDN, replacing the VNI in the received packet with the VLAN ID corresponding to the first IN-PDN on the target GW-U, and then deleting the VLAN ID from the replaced packet.

26. The target GW-U sends a forwarding rule update Ack to the GW-C.

Subsequently, an existing UE handover procedure may be performed.

Embodiment 2

Embodiment 2 corresponds to the foregoing eighth scenario, to be specific, the first UE is detached from the first GW-U. Before the first UE is detached, the first IN-PDN is distributed across the first GW-U and the other GW-U, and no other UE exists in the first IN-PDN on the first GW-U.

Figure 7:
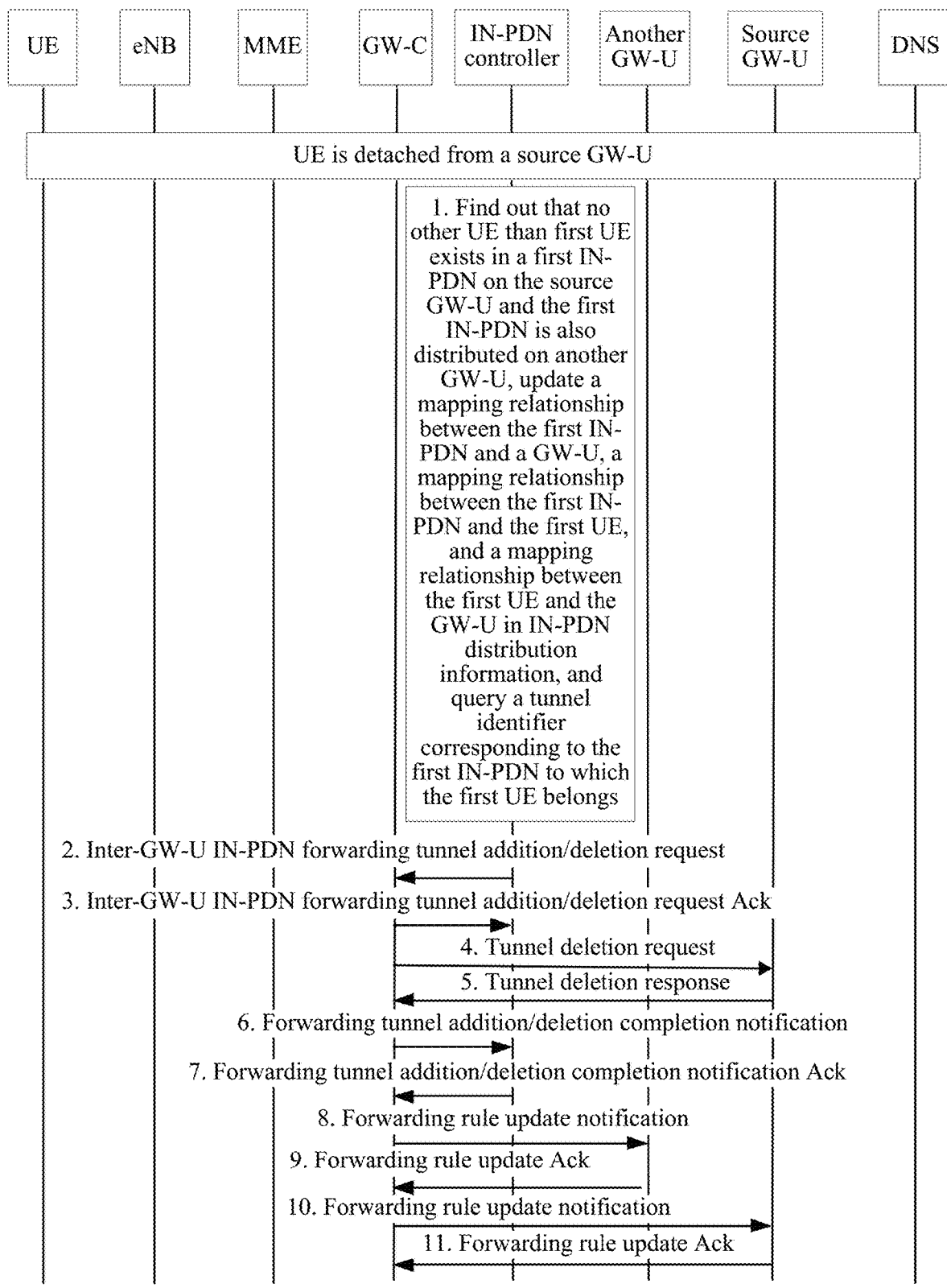
FIG. 7 is a schematic diagram of signaling exchange between network elements in a UE detachment scenario according to an embodiment of this application.

In this scenario, a signaling exchange procedure between network elements is shown in FIG. 7.

1. The first UE is detached from a source GW-U. An IN-PDN controller queries current IN-PDN distribution information, and finds out that no other UE than the first UE exists in the first IN-PDN on the source GW-U and the first IN-PDN is also distributed on the another GW-U. The IN-PDN controller updates a mapping relationship between the first IN-PDN and a GW-U, a mapping relationship between the first IN-PDN and the first UE, and a mapping relationship between the first UE and the GW-U in the IN-PDN distribution information based on a query result, and queries the IN-PDN distribution information for a tunnel identifier corresponding to the first IN-PDN to which the first UE belongs.

If the IN-PDN is implemented by using a VLAN technology, the IN-PDN controller correspondingly deletes information about the source GW-U and a VLAN ID corresponding to the first IN-PDN on the source GW-U from the IN-PDN distribution information, and deletes information about the first UE from information about UE connected to the source GW-U.

2. The IN-PDN controller sends an inter-GW-U IN-PDN forwarding tunnel addition/deletion request to the GW-C, where the request carries the tunnel identifier that corresponds to the first IN-PDN and that is queried by the IN-PDN controller, information about a GW-U on which tunnel addition/deletion is to be performed, an IN-PDN identifier of the first IN-PDN on each GW-U on which tunnel addition/deletion is to be performed, and a tunnel addition/deletion flag of each GW-U on which tunnel addition/deletion is to be performed.

If the IN-PDN is implemented by using the VLAN technology, the tunnel identifier may be indicated by using a VNI, the IN-PDN identifier may be indicated by using a VLAN ID, and the information about the GW-U may be indicated by using an IP address of the GW-U.

The IN-PDN controller may make an appointment with the GW-C in advance that, for example, the flag being equal to 0 indicates that a tunnel is deleted and a forwarding rule and a processing rule between tunnels are updated, the flag being equal to 1 indicates that a tunnel is set up and a forwarding rule and a processing rule between tunnels are updated, and the flag being equal to 2 indicates that a forwarding rule and a processing rule between tunnels are updated.

In this embodiment, a flag of the source GW-U is equal to 0, and a flag of the other GW-U on which the first IN-PDN is distributed is equal to 2.

3. The GW-C sends an inter-GW-U IN-PDN forwarding tunnel addition/deletion request Ack to the IN-PDN controller.

4. The GW-C receives a tunnel addition/deletion flag of the source GW-U that is equal to 0, and therefore sends a tunnel deletion request to the source GW-U, where the tunnel deletion request carries the tunnel identifier transferred from an IN-PDN controller in step 2.

5. The source GW-U sends a tunnel deletion response to the GW-C.

6. The GW-C sends a forwarding tunnel addition/deletion completion notification to the IN-PDN controller.

7. The IN-PDN controller sends a forwarding tunnel addition/deletion completion notification Ack to the GW-C.

8. The GW-C sends a forwarding rule update notification to the other GW-U, to update a forwarding rule and a processing rule of the other GW-U.

Updating of the forwarding rule and the processing rule is specifically: deleting a forwarding rule and a processing rule that are between UEs related to the first IN-PDN and that are from the another GW-U to the source GW-U.

9. The another GW-U sends a forwarding rule update Ack to the GW-C.

10. The GW-C sends a forwarding rule update notification to the source GW-U, to update a forwarding rule and a processing rule of the source GW-U.

Updating of the forwarding rule and the processing rule is specifically: deleting a forwarding rule and a processing rule that are between UEs related to the first IN-PDN and that are from the source GW-U to the other GW-U.

11. The source GW-U sends a forwarding rule update Ack to the GW-C.

Figure 8:
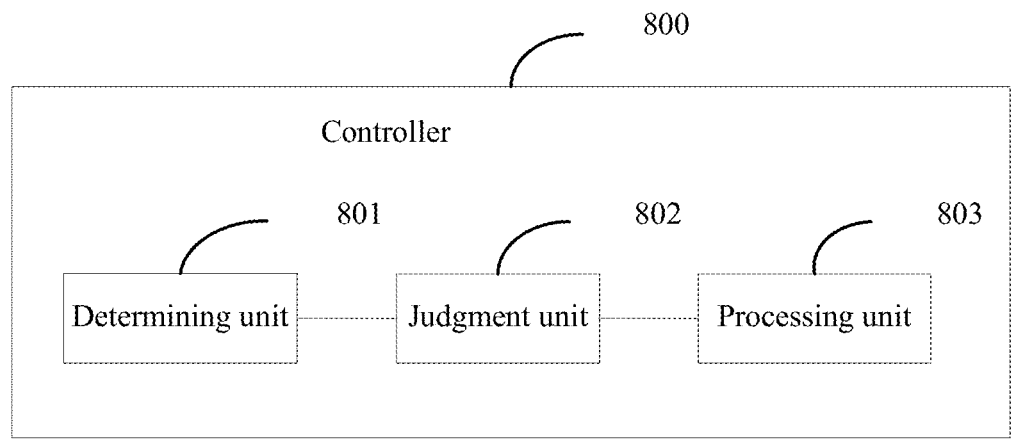
FIG. 8 is a schematic structural diagram of a controller according to an embodiment of this application.

Based on the foregoing network management method provided in this application, this application provides a controller 800, configured to implement functions of the controller in the foregoing network management method. As shown in FIG. 8, the controller 800 includes a determining unit 801, a judging unit 802, and a processing unit 803.

The determining unit 801 is configured to: when first UE is disconnected from a first base station, determine, based on IN-PDN distribution information, a first IN-PDN and a first user plane gateway that are accessed by the first UE before the first UE is disconnected from the first base station, where the IN-PDN distribution information is used to indicate a mapping relationship between IN-PDNs, GW-Us, and UEs.

The judging unit 802 is configured to determine, based on the IN-PDN distribution information, whether second UE and a second GW-U exist. There is a mapping relationship between the second UE and the first IN-PDN, there is also a mapping relationship between the second UE and the first GW-U, and there is a mapping relationship between the second GW-U and the first IN-PDN.

The processing unit 803 is configured to determine, based on a determining result of the judging unit 802 about whether the second UE and the second GW-U exist, whether to update a mapping relationship between the first IN-PDN and a forwarding tunnel, a mapping relationship between the first IN-PDN and the first UE, and a mapping relationship between the first IN-PDN and a GW-U.

Optionally, that the first UE is disconnected from the first base station may specifically include the following two scenarios: the first UE is handed over from the first base station to a second base station, or the first UE is detached from the first base station.

Optionally, the IN-PDN distribution information is used to indicate a mapping relationship between an IN-PDN and a user plane gateway, a mapping relationship between a user plane gateway and UE, and a mapping relationship between an IN-PDN and UE.

Optionally, before the judging unit 802 determines, based on the IN-PDN distribution information, whether the second UE and the second GW-U exist, the processing unit 803 may further be configured to delete a mapping relationship between the first UE and the first GW-U from the IN-PDN distribution information.

Optionally, the controller 800 further includes a network interface.

In the detachment scenario, when the first UE is detached from the first base station, and the determining result is that the IN-PDN distribution information includes the second GW-U but does not include the second UE, the processing unit 803 is specifically configured to: delete a mapping relationship between the first GW-U and the first IN-PDN, the mapping relationship between the first GW-U and the first UE, and the mapping relationship between the first UE and the first IN-PDN from the IN-PDN distribution information; and obtain a tunnel identifier corresponding to the first IN-PDN, and send an indication message to a GW-C by using the network interface. The indication message is used to instruct to delete a forwarding tunnel whose identifier is the tunnel identifier corresponding to the first IN-PDN and whose endpoints are the first GW-U and the second GW-U, and is used to instruct to delete a processing rule and a forwarding rule that are between UEs associated with the first IN-PDN and that are between the first GW-U and the second GW-U.

Optionally, when the first UE is handed over from the first base station to the second base station, and before the judging unit 802 determines, based on the IN-PDN distribution information, whether the second UE and the second GW-U exist, the processing unit 803 may be further configured to determine a third GW-U accessed by the first UE after the first UE is handed over from the first base station to the second base station, and determine, based on the IN-PDN distribution information, whether there is a mapping relationship between the third GW-U and the first IN-PDN; and if there is no mapping relationship between the third GW-U and the first IN-PDN, create the first IN-PDN on the third GW-U, and add the mapping relationship between the third GW-U and the first IN-PDN and a mapping relationship between the third GW-U and the first UE to the IN-PDN distribution information; or if there is a mapping relationship between the third GW-U and the first IN-PDN, add a mapping relationship between the third GW-U and the first UE to the IN-PDN distribution information.

Optionally, in a case of the handover scenario, when the determining result is that the IN-PDN distribution information includes the second GW-U but does not include the second UE, and there is no mapping relationship between the third GW-U and the first IN-PDN, the processing unit 803 is specifically configured to: delete the mapping relationship between the first GW-U and the first IN-PDN and the mapping relationship between the first UE and the first IN-PDN from the IN-PDN distribution information; and obtain a tunnel identifier corresponding to the first IN-PDN, and send an indication message to a GW-C by using the network interface. The indication message is used to instruct to delete a forwarding tunnel whose identifier is the tunnel identifier corresponding to the first IN-PDN and whose endpoints are the first GW-U and the second GW-U, is used to instruct to delete a processing rule and a forwarding rule that are between UEs associated with the first IN-PDN and that are between the first GW-U and the second GW-U, is used to instruct to create a forwarding tunnel whose identifier is the tunnel identifier corresponding to the first IN-PDN and whose endpoints are the second GW-U and the third GW-U, and is used to instruct to create a processing rule and a forwarding rule that are between UEs associated with the first IN-PDN and that are between the second GW-U and the third GW-U.

Optionally, in a case of the handover scenario, when the determining result is that the IN-PDN distribution information includes the second GW-U and the second UE, and there is no mapping relationship between the third GW-U and the first IN-PDN, the processing unit 803 is specifically configured to obtain a tunnel identifier corresponding to the first IN-PDN, and send an indication message to a GW-C by using the network interface. The indication message is used to instruct to create a forwarding tunnel whose identifier is the tunnel identifier corresponding to the first IN-PDN and whose endpoints are the first GW-U and the third GW-U, is used to instruct to create a forwarding tunnel whose identifier is the tunnel identifier corresponding to the first IN-PDN and whose endpoints are the second GW-U and the third GW-U, is used to instruct to create a processing rule and a forwarding rule that are between UEs associated with the first IN-PDN and that are between the first GW-U and the third GW-U, and is used to instruct to create a processing rule and a forwarding rule that are between UEs associated with the first IN-PDN and that are between the second GW-U and the third GW-U.

Optionally, in a case of the handover scenario, when the determining result is that the IN-PDN distribution information does not include the second GW-U but includes the second UE, and there is no mapping relationship between the third GW-U and the first IN-PDN, the processing unit 803 is specifically configured to obtain a tunnel identifier corresponding to the first IN-PDN, and send an indication message to a GW-C by using the network interface. The indication message is used to instruct to create a forwarding tunnel whose identifier is the tunnel identifier corresponding to the first IN-PDN and whose endpoints are the first GW-U and the third GW-U, and is used to instruct to create a processing rule and a forwarding rule that are between UEs associated with the first IN-PDN and that are between the first GW-U and the third GW-U.

Optionally, before the processing unit 803 sends the indication message to the GW-C by using the network interface, the processing unit 803 is further configured to determine a second IN-PDN identifier and a second tunnel port that correspond to the first IN-PDN on the second GW-U, and determine a third IN-PDN identifier and a third tunnel port that correspond to the first IN-PDN on the third GW-U.

Correspondingly, the processing rule and the forwarding rule that are between the UEs associated with the first IN-PDN and that are between the second GW-U and the third GW-U are: adding the second IN-PDN identifier to a packet sent by UE to the first UE in the first IN-PDN to which the second GW-U is corresponding, replacing the second IN-PDN identifier in the packet to which the second IN-PDN identifier is added with the tunnel identifier corresponding to the first IN-PDN, and forwarding the replaced packet to the third tunnel port by using the second tunnel port; receiving a packet from the third tunnel port by using the second tunnel port, replacing the tunnel identifier corresponding to the first IN-PDN in the packet received by using the second tunnel port with the second IN-PDN identifier, and deleting the second IN-PDN identifier from the replaced packet; adding the third IN-PDN identifier to a packet sent by the first UE to the UE in the first IN-PDN to which the second GW-U is corresponding, replacing the third IN-PDN identifier in the packet to which the third IN-PDN identifier is added with the tunnel identifier corresponding to the first IN-PDN, and forwarding the replaced packet to the second tunnel port by using the third tunnel port; and receiving a packet from the second tunnel port by using the third tunnel port, replacing the tunnel identifier corresponding to the first IN-PDN in the packet received by using the third tunnel port with the third IN-PDN identifier, and deleting the third IN-PDN identifier from the replaced packet.

Optionally, before the processing unit 803 sends the indication message to the GW-C by using the network interface, the processing unit 803 is further configured to determine a first IN-PDN identifier and a first tunnel port that correspond to the first IN-PDN on the first GW-U, and determine a third IN-PDN identifier and a third tunnel port that correspond to the first IN-PDN on the third GW-U.

Correspondingly, the processing rule and the forwarding rule that are between the UEs associated with the first IN-PDN and that are between the first GW-U and the third GW-U are: adding the first IN-PDN identifier to a packet sent by UE to the first UE in the first IN-PDN to which the first GW-U is corresponding, replacing the first IN-PDN identifier in the packet to which the first IN-PDN identifier is added with the tunnel identifier corresponding to the first IN-PDN, and forwarding the replaced packet to the third tunnel port by using the first tunnel port; receiving a packet from the third tunnel port by using the first tunnel port, replacing the tunnel identifier corresponding to the first IN-PDN in the packet received by using the first tunnel port with the first IN-PDN identifier, and deleting the first IN-PDN identifier from the replaced packet; adding the third IN-PDN identifier to a packet sent by the first UE to the UE in the first IN-PDN to which the first GW-U is corresponding, replacing the third IN-PDN identifier in the packet to which the third IN-PDN identifier is added with the tunnel identifier corresponding to the first IN-PDN, and forwarding the replaced packet to the first tunnel port by using the third tunnel port; and receiving a packet from the first tunnel port by using the third tunnel port, replacing the tunnel identifier corresponding to the first IN-PDN in the packet received by using the third tunnel port with the third IN-PDN identifier, and deleting the third IN-PDN identifier from the replaced packet.

Optionally, if the first IN-PDN is implemented by using a VLAN, the tunnel identifier corresponding to the first IN-PDN may be indicated by using a VNI. The first tunnel port, the second tunnel port, and the third tunnel port are indicated by using an IP address of a VTEP. The first IN-PDN identifier, the second IN-PDN identifier, and the third IN-PDN identifier are indicated by using a VLAN ID.

For details that are not exhaustive in this embodiment, refer to the descriptions about the controller in the method shown in FIG. 5, and details are not described herein again.

It should be noted that unit division in this embodiment of the present application is an example, and is merely division of logical functions. During actual implementation, another division manner may be used. Functional units in this embodiment of this application may be integrated into one processing unit, or each of the units may exist alone physically, or two or more units may be integrated into one unit. The integrated unit may be implemented in a form of hardware, or may be implemented in a form of a software functional unit.

Figure 9:
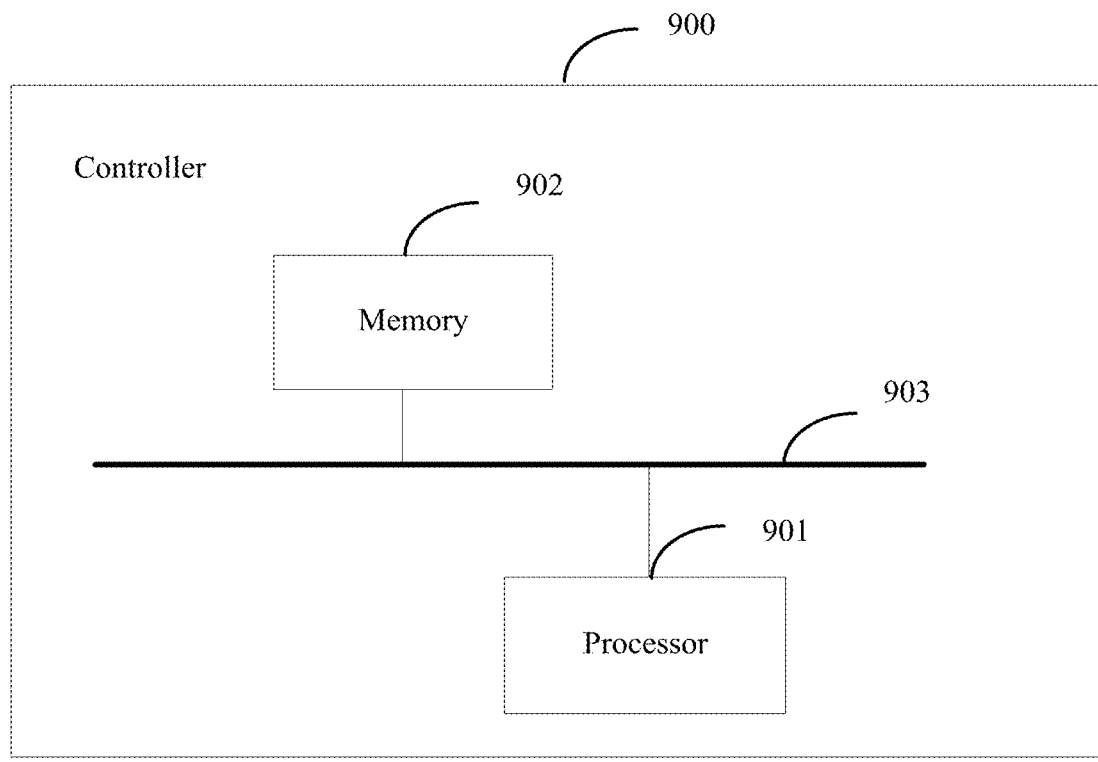
FIG. 9 is a schematic structural diagram of another controller according to an embodiment of this application.

When the integrated unit is implemented in the form of hardware, physical hardware corresponding to the determining unit 801, the judging unit 802, and the processing unit 803 may be a processor, for example, a processor 901 in FIG. 9.

The controller 800 according to this embodiment of this application may correspond to the controller in the network management method according to the embodiments of the present application, and the foregoing and other operations and/or functions of the units in the controller 800 are respectively intended to implement corresponding procedures in the methods in FIG. 3 to FIG. 7. For brevity, details are not described herein again.

Based on the foregoing network management method, this application further provides a controller 900. As shown in FIG. 9, the controller 900 includes a processor 901 and a memory 902. For example, the processor 901 and the memory 902 are connected to each other by using a bus 903.

The memory 902 is configured to store an instruction executable to the processor 901.

The processor 901 is configured to: when first UE is disconnected from a first base station, determine, based on IN-PDN distribution information, a first IN-PDN and a first user plane gateway that are accessed by the first UE before the first UE is disconnected from the first base station, where the IN-PDN distribution information is used to indicate a mapping relationship between an IN-PDN, a user plane gateway, and UE; determine, based on the IN-PDN distribution information, whether second UE and a second GW-U exist, where there is a mapping relationship between the second UE and the first IN-PDN, there is also a mapping relationship between the second UE and the first GW-U, and there is a mapping relationship between the second GW-U and the first IN-PDN; and determine, based on a determining result about whether the second UE and the second GW-U exist, whether to update a mapping relationship between the first IN-PDN and a forwarding tunnel, a mapping relationship between the first IN-PDN and the first UE, and a mapping relationship between the first IN-PDN and a GW-U.

In conclusion, according to the technical solutions provided in this application, the elastic scaling of the IN-PDN is implemented. When the UE is migrated or detached, the service continuity in the local network of the UE can still be ensured, and an IN-PDN resource that is no longer used is reclaimed in time, thereby avoiding a waste of the IN-PDN resource.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of the present application have been described, persons skilled in the art can make changes and modifications to these embodiments once they learn of the basic inventive concept. Therefore, the following claims are intended to be construed as to cover the embodiments and all changes and modifications falling within the scope of the present application.

Obviously, persons skilled in the art can make various modifications and variations to the embodiments of the present application without departing from the spirit and scope of the embodiments of the present application. The present application is intended to cover these modifications and variations provided that they fall within the scope defined by the claims of the present application and their equivalent technologies.

What is claimed is:

1. A network management method comprising:
   when a first user equipment (UE) is disconnected from a first base station, determining, by a controller based on in-network packet data network (IN-PDN) distribution information, a first IN-PDN and a first user plane gateway that are accessed by the first UE before the first UE is disconnected from the first base station, wherein the IN-PDN distribution information indicates a mapping relationship between the first IN-PDN, the first user plane gateway and the first UE;

determining, by the controller based on the IN-PDN distribution information, whether a second UE and a second user plane gateway exist, wherein there is a mapping relationship between the second UE and the first IN-PDN, a mapping relationship between the second UE and the first user plane gateway, and a mapping relationship between the second user plane gateway and the first IN-PDN; and determining, by the controller based on a determining result about whether the second UE and the second user plane gateway exist, whether to update a mapping relationship between the first IN-PDN and a forwarding tunnel, a mapping relationship between the first IN-PDN and the first UE, and a mapping relationship between the first IN-PDN and the first user plane gateway.

2. The method according to claim 1, wherein the first UE is disconnected from the first base station when:
the first UE is handed over from the first base station to a second base station; or
the first UE is detached from the first base station.

3. The method according to claim 2, wherein, when the first UE is detached from the first base station and a determining result is that the IN-PDN distribution information comprises the second user plane gateway but does not comprise the second UE, determining, by the controller based on the determining result about whether the second UE and the second user plane gateway exist, whether to update the mapping relationship between the first IN-PDN and the forwarding tunnel, the mapping relationship between the first IN-PDN and the first UE, and the mapping relationship between the first IN-PDN and the first user plane gateway comprises:
deleting, by the controller, the mapping relationship between the first IN-PDN and the first user plane gateway, the mapping relationship between the first user plane gateway and the first UE, and the mapping relationship between the first UE and the first IN-PDN from the IN-PDN distribution information;
obtaining, by the controller, a tunnel identifier corresponding to the first IN-PDN; and
sending an indication message to a control plane gateway for instructing the control plane gateway to delete a forwarding tunnel whose identifier is the tunnel identifier corresponding to the first IN-PDN and whose endpoints are the first user plane gateway and the second user plane gateway, and to delete a processing rule and a forwarding rule that are between UEs associated with the first IN-PDN and that are between the first user plane gateway and the second user plane gateway.

4. The method according to claim 2, wherein, when the first UE is handed over from the first base station to the second base station, before determining, by the controller based on the IN-PDN distribution information, whether the second UE and the second user plane gateway exist, the method further comprises:
determining, by the controller, a third user plane gateway accessed by the first UE after the first UE is handed over from the first base station to the second base station;
determining, by the controller based on the IN-PDN distribution information, whether there is a mapping relationship between the third user plane gateway and the first IN-PDN;
when there is no mapping relationship between the third user plane gateway and the first IN-PDN, creating, by the controller, the first IN-PDN on the third user plane gateway, and adding the mapping relationship between the third user plane gateway and the first IN-PDN and a mapping relationship between the third user plane gateway and the first UE to the IN-PDN distribution information; and when there is a mapping relationship between the third user plane gateway and the first IN-PDN, adding, by the controller, a mapping relationship between the third user plane gateway and the first UE to the IN-PDN distribution information.

5. The method according to claim 4, wherein, when a determining result is that the IN-PDN distribution information comprises the second user plane gateway but does not comprise the second UE and there is no mapping relationship between the third user plane gateway and the first IN-PDN, determining, by the controller based on the determining result about whether the second UE and the second user plane gateway exist, whether to update the mapping relationship between the first IN-PDN and the forwarding tunnel, the mapping relationship between the first IN-PDN and the first UE, and the mapping relationship between the first IN-PDN and the first user plane gateway comprises:
deleting, by the controller, the mapping relationship between the first IN-PDN and the first user plane gateway, and the mapping relationship between the first UE and the first IN-PDN from the IN-PDN distribution information;
obtaining, by the controller, a tunnel identifier corresponding to the first IN-PDN; and
sending an indication message to a control plane gateway for instructing the control plane gateway to delete a forwarding tunnel whose identifier is the tunnel identifier corresponding to the first IN-PDN and whose endpoints are the first user plane gateway and the second user plane gateway, to delete a processing rule and a forwarding rule that are between UEs associated with the first IN-PDN and that are between the first user plane gateway and the second user plane gateway, to create a forwarding tunnel whose identifier is the tunnel identifier corresponding to the first IN-PDN and whose endpoints are the second user plane gateway and the third user plane gateway, and to create a processing rule and a forwarding rule that are between UEs associated with the first IN-PDN and that are between the second user plane gateway and the third user plane gateway.

6. The method according to claim 5,
wherein, before sending, by the controller, the indication message to the control plane gateway, the method further comprises:
determining, by the controller, a second IN-PDN identifier and a second tunnel port that correspond to the first IN-PDN on the second user plane gateway and determining a third IN-PDN identifier and a third tunnel port that correspond to the first IN-PDN on the third user plane gateway, and
wherein the processing rule and the forwarding rule that are between the UEs associated with the first IN-PDN and that are between the second user plane gateway and the third user plane gateway comprise:
adding the second IN-PDN identifier to a packet sent by a UE to the first UE in the first IN-PDN to which the second user plane gateway corresponds,
replacing the second IN-PDN identifier in the packet to which the second IN-PDN identifier is added with the tunnel identifier corresponding to the first IN-PDN, forwarding the replaced packet to the third tunnel port by using the second tunnel port, receiving the packet from the third tunnel port by using the second tunnel port, replacing the tunnel identifier corresponding to the first IN-PDN in the packet received by using the second tunnel port with the second IN-PDN identifier, and deleting the second IN-PDN identifier from the replaced packet; and adding the third IN-PDN identifier to a packet sent by the first UE to the UE in the first IN-PDN to which the second user plane gateway corresponds, replacing the third IN-PDN identifier in the packet to which the third IN-PDN identifier is added with the tunnel identifier corresponding to the first IN-PDN, forwarding the replaced packet to the second tunnel port by using the third tunnel port, receiving the packet from the second tunnel port by using the third tunnel port, replacing the tunnel identifier corresponding to the first IN-PDN in the packet received by using the third tunnel port with the third IN-PDN identifier, and deleting the third IN-PDN identifier from the replaced packet.

7. The method according to claim 4, wherein, when a determining result is that the IN-PDN distribution information comprises the second user plane gateway and the second UE and there is no mapping relationship between the third user plane gateway and the first IN-PDN, determining, by the controller based on the determining result about whether the second UE and the second user plane gateway exist, whether to update the mapping relationship between the first IN-PDN and the forwarding tunnel, the mapping relationship between the first IN-PDN and the first UE, and the mapping relationship between the first IN-PDN and the first user plane gateway comprises:

obtaining, by the controller, a tunnel identifier corresponding to the first IN-PDN; and sending an indication message to a control plane gateway for instructing the control plane gateway to create a forwarding tunnel whose identifier is the tunnel identifier corresponding to the first IN-PDN and whose endpoints are the first user plane gateway and the third user plane gateway, to create a forwarding tunnel whose identifier is the tunnel identifier corresponding to the first IN-PDN and whose endpoints are the second user plane gateway and the third user plane gateway, to create a processing rule and a forwarding rule that are between UEs associated with the first IN-PDN and that are between the first user plane gateway and the third user plane gateway, and to create a processing rule and a forwarding rule that are between UEs associated with the first IN-PDN and that are between the second user plane gateway and the third user plane gateway.

8. The method according to claim 4, wherein, when a determining result is that the IN-PDN distribution information does not comprise the second user plane gateway but comprises the second UE and there is no mapping relationship between the third user plane gateway and the first IN-PDN, determining, by the controller based on the determining result about whether the second UE and the second user plane gateway exist, whether to update the mapping relationship between the first IN-PDN and the forwarding tunnel, the mapping relationship between the first IN-PDN and the first UE, and the mapping relationship between the first IN-PDN and the first user plane gateway comprises:

obtaining, by the controller, a tunnel identifier corresponding to the first IN-PDN; and sending an indication message to a control plane gateway for instructing the control plane gateway to create a forwarding tunnel whose identifier is the tunnel identifier corresponding to the first IN-PDN and whose endpoints are the first user plane gateway and the third user plane gateway, and to create a processing rule and a forwarding rule that are between UEs associated with the first IN-PDN and that are between the first user plane gateway and the third user plane gateway.

9. The method according to claim 1, wherein the IN-PDN distribution information indicates a mapping relationship between an IN-PDN and a user plane gateway, a mapping relationship between a user plane gateway and UE, and a mapping relationship between an IN-PDN and UE.

10. The method according to claim 1, further comprising deleting, by the controller, a mapping relationship between the first UE and the first user plane gateway from the IN-PDN distribution information before determining, by the controller based on the IN-PDN distribution information, whether the second UE and the second user plane gateway exist.

11. A controller comprising:

a processor; and a memory configured to store instructions which, when executed by the processor, cause the controller to:

when a first user equipment (UE) is disconnected from a first base station, determine, based on in-network packet data network (IN-PDN) distribution information, a first IN-PDN and a first user plane gateway that are accessed by the first UE before the first UE is disconnected from the first base station, wherein the IN-PDN distribution information indicates a mapping relationship between the first IN-PDN, the first user plane gateway and the first UE;

determine, based on the IN-PDN distribution information, whether a second UE and a second user plane gateway exist, wherein there is a mapping relationship between the second UE and the first IN-PDN, a mapping relationship between the second UE and the first user plane gateway, and a mapping relationship between the second user plane gateway and the first IN-PDN; and determine, based on a determining result about whether the second UE and the second user plane gateway exist, whether to update a mapping relationship between the first IN-PDN and a forwarding tunnel, a mapping relationship between the first IN-PDN and the first UE, and a mapping relationship between the first IN-PDN and the first user plane gateway.

12. The controller according to claim 11, wherein the first UE is disconnected from the first base station when:

the first UE is handed over from the first base station to a second base station; or the first UE is detached from the first base station.

13. The controller according to claim 12, wherein the controller further comprises a network interface, and wherein, when the first UE is detached from the first base station and a determining result is that the IN-PDN distribution information comprises the second user plane gateway but does not comprise the second UE, the instructions to determine, based on the determining result about whether the second UE and the second user plane gateway exist, whether to update the mapping relationship between the first IN-PDN and the forwarding tunnel, the mapping relationship between the first IN-PDN and the first UE, and the mapping relationship between the first IN-PDN and the first user plane gateway, comprise the instructions to:
  delete the mapping relationship between the first IN-PDN and the first user plane gateway, the mapping relationship between the first user plane gateway and the first UE, and the mapping relationship between the first UE and the first IN-PDN from the IN-PDN distribution information;
  obtain a tunnel identifier corresponding to the first IN-PDN; and
  send an indication message to a control plane gateway by using the network interface for instructing the control plane gateway to delete a forwarding tunnel whose identifier is the tunnel identifier corresponding to the first IN-PDN and whose endpoints are the first user plane gateway and the second user plane gateway, and to delete a processing rule and a forwarding rule that are between UEs associated with the first IN-PDN and that are between the first user plane gateway and the second user plane gateway.

14. The controller according to claim 12, wherein, when the first UE is handed over from the first base station to the second base station, before the controller determines, based on the IN-PDN distribution information, whether the second UE and the second user plane gateway exist, the instructions, when executed by the processor, further cause the controller to:
  determine a third user plane gateway accessed by the first UE after the first UE is handed over from the first base station to the second base station;
  determine, based on the IN-PDN distribution information, whether there is a mapping relationship between the third user plane gateway and the first IN-PDN;
  when there is no mapping relationship between the third user plane gateway and the first IN-PDN, create the first IN-PDN on the third user plane gateway, and add the mapping relationship between the third user plane gateway and the first IN-PDN and a mapping relationship between the third user plane gateway and the first UE to the IN-PDN distribution information; and
  when there is a mapping relationship between the third user plane gateway and the first IN-PDN, add a mapping relationship between the third user plane gateway and the first UE to the IN-PDN distribution information.

15. The controller according to claim 14,
wherein the controller further comprises a network interface, and
wherein, when a determining result is that the IN-PDN distribution information comprises the second user plane gateway but does not comprise the second UE and there is no mapping relationship between the third user plane gateway and the first IN-PDN, the instructions to determine, based on the determining result about whether the second UE and the second user plane gateway exist, whether to update the mapping relationship between the first IN-PDN and the forwarding tunnel, the mapping relationship between the first IN-PDN and the first UE, and the mapping relationship between the first IN-PDN and the first user plane gateway, comprise the instructions to:
  delete the mapping relationship between the first IN-PDN and the first user plane gateway, and the mapping relationship between the first UE and the first IN-PDN from the IN-PDN distribution information;
  obtain a tunnel identifier corresponding to the first IN-PDN; and
  send an indication message to a control plane gateway by using the network interface for instructing the control plane gateway to delete a forwarding tunnel whose identifier is the tunnel identifier corresponding to the first IN-PDN and whose endpoints are the first user plane gateway and the second user plane gateway, to delete a processing rule and a forwarding rule that are between UEs associated with the first IN-PDN and that are between the first user plane gateway and the second user plane gateway, to create a forwarding tunnel whose identifier is the tunnel identifier corresponding to the first IN-PDN and whose endpoints are the second user plane gateway and the third user plane gateway, and to create a processing rule and a forwarding rule that are between UEs associated with the first IN-PDN and that are between the second user plane gateway and the third user plane gateway.

16. The controller according to claim 15,
wherein, before the controller sends the indication message to the control plane gateway by using the network interface, the instructions, when executed by the processor, further cause the controller to determine a second IN-PDN identifier and a second tunnel port that correspond to the first IN-PDN on the second user plane gateway, and determine a third IN-PDN identifier and a third tunnel port that correspond to the first IN-PDN on the third user plane gateway, and
wherein the processing rule and the forwarding rule that are between the UEs associated with the first IN-PDN and that are between the second user plane gateway and the third user plane gateway comprise:
  adding the second IN-PDN identifier to a packet sent by a UE to the first UE in the first IN-PDN to which the second user plane gateway corresponds,
  replacing the second IN-PDN identifier in the packet to which the second IN-PDN identifier is added with the tunnel identifier corresponding to the first IN-PDN,
  forwarding the replaced packet to the third tunnel port by using the second tunnel port,
  receiving the packet from the third tunnel port by using the second tunnel port,
  replacing the tunnel identifier corresponding to the first IN-PDN in the packet received by using the second tunnel port with the second IN-PDN identifier, and
  deleting the second IN-PDN identifier from the replaced packet; and
  adding the third IN-PDN identifier to a packet sent by the first UE to the UE in the first IN-PDN to which the second user plane gateway corresponds,
  replacing the third IN-PDN identifier in the packet to which the third IN-PDN identifier is added with the tunnel identifier corresponding to the first IN-PDN,
  forwarding the replaced packet to the second tunnel port by using the third tunnel port,
  receiving the packet from the second tunnel port by using the third tunnel port,
  replacing the tunnel identifier corresponding to the first IN-PDN in the packet received by using the third tunnel port with the third IN-PDN identifier, and
  deleting the third IN-PDN identifier from the replaced packet.

17. The controller according to claim 14,
wherein the controller further comprises a network interface, and
wherein, when a determining result is that the IN-PDN distribution information comprises the second user plane gateway and the second UE and there is no mapping relationship between the third user plane gateway and the first IN-PDN, the instruction to determine, based on the determining result about whether the second UE and the second user plane gateway exist, whether to update the mapping relationship between the first IN-PDN and the forwarding tunnel, the mapping relationship between the first IN-PDN and the first UE, and the mapping relationship between the first IN-PDN and the first user plane gateway, comprise the instructions to:
obtain a tunnel identifier corresponding to the first IN-PDN; and
send an indication message to a control plane gateway by using the network interface for instructing the control plane gateway to create a forwarding tunnel whose identifier is the tunnel identifier corresponding to the first IN-PDN and whose endpoints are the first user plane gateway and the third user plane gateway, to create a forwarding tunnel whose identifier is the tunnel identifier corresponding to the first IN-PDN and whose endpoints are the second user plane gateway and the third user plane gateway, to create a processing rule and a forwarding rule that are between UEs associated with the first IN-PDN and that are between the first user plane gateway and the third user plane gateway, and to create a processing rule and a forwarding rule that are between UEs associated with the first IN-PDN and that are between the second user plane gateway and the third user plane gateway.

18. The controller according to claim 14,
wherein the controller further comprises a network interface, and
wherein, when a determining result is that the IN-PDN distribution information does not comprise the second user plane gateway but comprises the second UE and there is no mapping relationship between the third user plane gateway and the first IN-PDN, the instructions to determine, based on the determining result about whether the second UE and the second user plane gateway exist, whether to update the mapping relationship between the first IN-PDN and the forwarding tunnel, the mapping relationship between the first IN-PDN and the first UE, and the mapping relationship between the first IN-PDN and the first user plane gateway, comprise the instructions to:
obtain a tunnel identifier corresponding to the first IN-PDN; and
send an indication message to a control plane gateway by using the network interface for instructing the control plane gateway to create a forwarding tunnel whose identifier is the tunnel identifier corresponding to the first IN-PDN and whose endpoints are the first user plane gateway and the third user plane gateway, and to create a processing rule and a forwarding rule that are between UEs associated with the first IN-PDN and that are between the first user plane gateway and the third user plane gateway.

19. The controller according to claim 11, wherein the IN-PDN distribution information indicates a mapping relationship between an IN-PDN and a user plane gateway, a mapping relationship between a user plane gateway and UE, and a mapping relationship between an IN-PDN and UE.

20. The controller according to claim 11, further comprising instructions, when executed by the processor, cause the controller to delete a mapping relationship between the first UE and the first user plane gateway from the IN-PDN distribution information before the controller determines, based on the IN-PDN distribution information, whether the second UE and the second user plane gateway exist.

* * * * *